(12) United States Patent
Yabe et al.

(10) Patent No.: US 6,435,720 B1
(45) Date of Patent: Aug. 20, 2002

(54) LINEAR GUIDE DEVICE

(75) Inventors: Shiroji Yabe; Soichiro Kato; Nobumitsu Takahashi; Ryoichi Sato; Yoshinori Mizumura; Hiroki Yamaguchi, all of Gunma (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/488,638

(22) Filed: Jan. 21, 2000

(30) Foreign Application Priority Data

| Jan. 22, 1999 | (JP) | 11-014718 |
|---|---|---|
| Feb. 19, 1999 | (JP) | 11-042272 |
| Feb. 19, 1999 | (JP) | 11-042273 |
| Apr. 28, 1999 | (JP) | 11-123016 |
| Jun. 14, 1999 | (JP) | 11-166900 |

(51) Int. Cl.$^7$ .................................. F16C 29/06
(52) U.S. Cl. .................... 384/43; 384/49; 384/51
(58) Field of Search .................. 384/43, 44, 45, 384/51, 450, 523, 524, 525, 526, 527, 528, 529, 530, 531, 532, 533, 534, 572, 573, 574, 575, 576, 577, 578, 579, 580

(56) References Cited

U.S. PATENT DOCUMENTS

| 4,293,166 A | * | 10/1981 | Ernst et al. | 384/45 |
|---|---|---|---|---|
| 4,472,003 A | * | 9/1984 | Osawa | 384/45 |
| 4,508,395 A | * | 4/1985 | Heine | 384/43 |
| 5,137,371 A | * | 8/1992 | Osawa | 384/45 |
| 5,308,164 A | * | 5/1994 | Tanaka | 384/44 X |
| 5,308,166 A | * | 5/1994 | Osawa | 384/45 |
| 5,308,170 A | * | 5/1994 | Yamaguchi et al. | 384/43 X |
| 5,927,858 A | * | 7/1999 | Agari | 384/45 |
| 6,102,572 A | * | 8/2000 | Hidano | 384/45 |
| 6,152,602 A | * | 11/2000 | Honma et al. | 384/45 |
| 6,155,718 A | * | 12/2000 | Takamatsu et al. | 384/45 |

FOREIGN PATENT DOCUMENTS

| JP | 59-103928 | 7/1984 | F16C/29/06 |
|---|---|---|---|
| JP | 68-8330 | 2/1988 | F16C/29/06 |
| JP | 2000-220635 | * 8/2000 | 384/45 |

* cited by examiner

Primary Examiner—David A. Bucci
Assistant Examiner—Colby Hansen
(74) Attorney, Agent, or Firm—Sughrue Mion, PLLC

(57) ABSTRACT

A linear guide device is provided with a plurality of rolling elements. A guide rail extending in an axial direction thereof and including a plurality of rolling element rolling grooves in two side portions thereof is provided in the device, wherein the rolling grooves extend in an axial direction of the guide rail. A slider includes a plurality of rolling element rolling grooves respectively opposed to the rolling element rolling grooves of the guide rail, wherein the slider is supported on the guide rail in such a manner that the slider is movable along the axial direction of the guide rail through the rolling movements of the rolling elements respectively inserted between the rolling element rolling grooves of the slider. The slider includes a rolling element endless circulation track along which the rolling elements are allowed to circulate endlessly; and a plurality of separators, each interposed between the adjoining rolling elements in the circulation direction of the rolling elements. A clearance is formed between a line of the rolling elements and the separators which are endlessly circulated.

2 Claims, 17 Drawing Sheets

MINIMUM VALUE OF CLEARANCE VARIATION

MAXIMUM VALUE OF CLEARANCE VARIATION

ADVANCE DIRECTION OF STEEL BALL

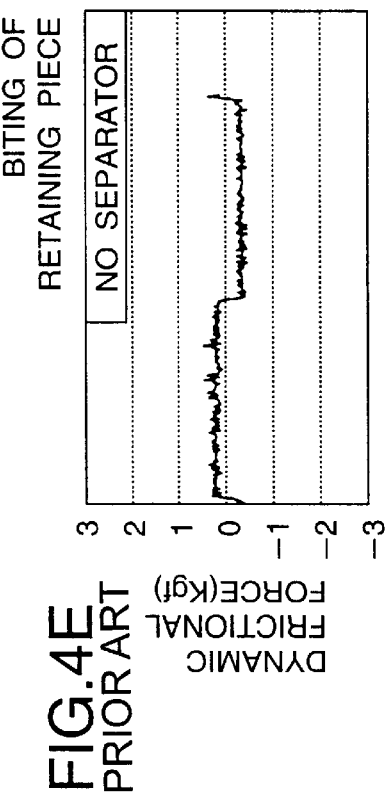
FIG.4D PRIOR ART
FIG.4E PRIOR ART
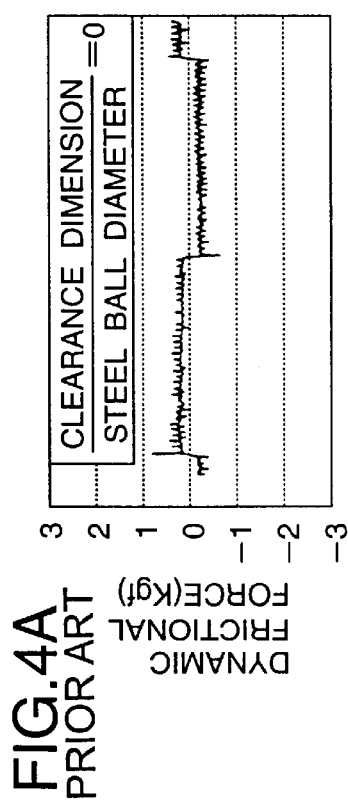
FIG.4A PRIOR ART
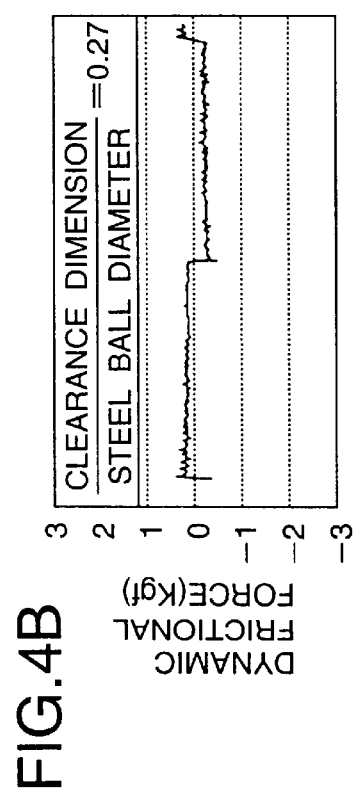
FIG.4B
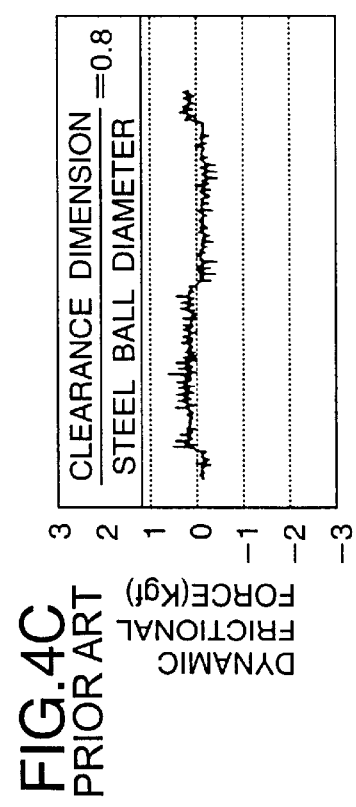
FIG.4C PRIOR ART

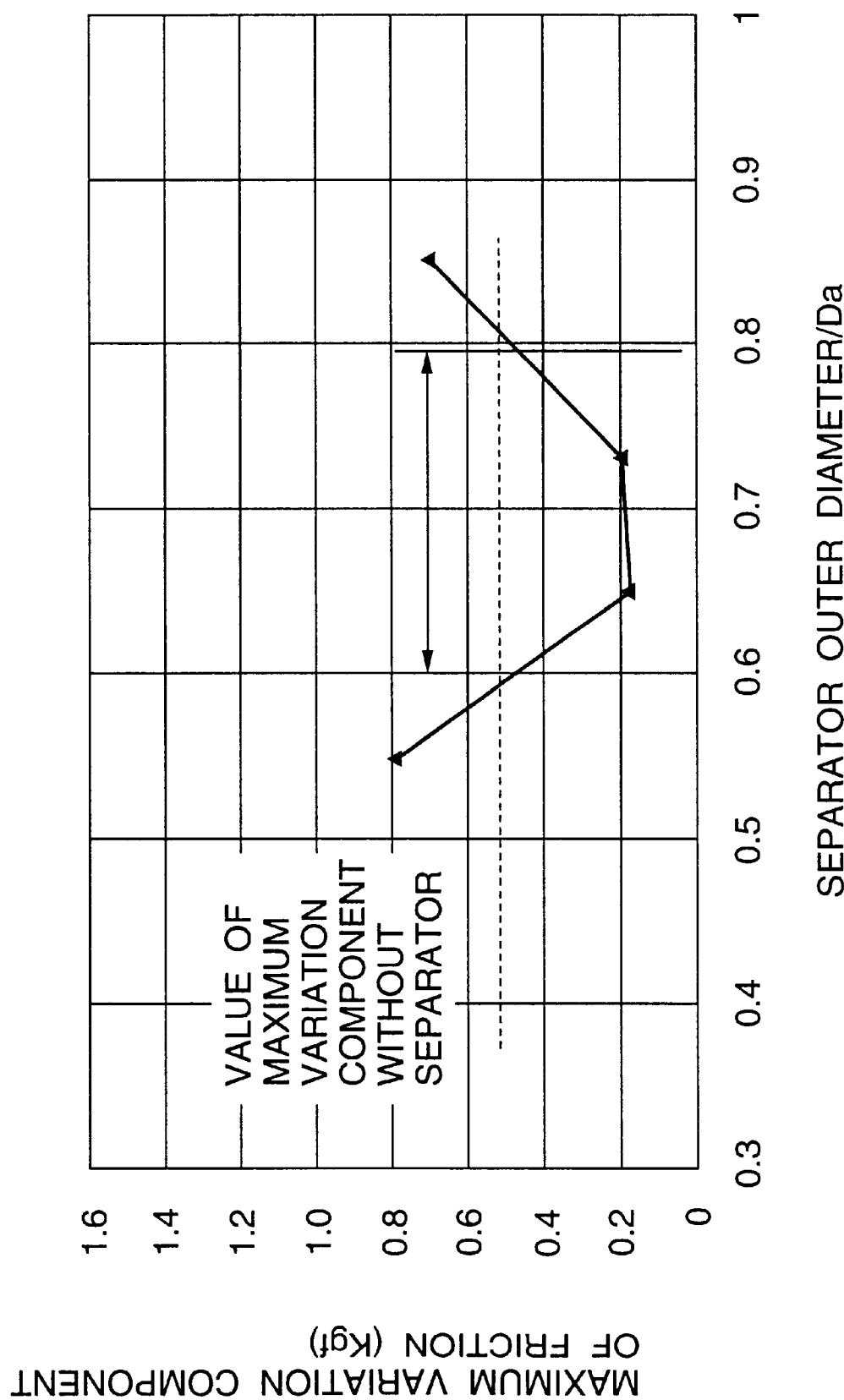

LINEAR GUIDE DEVICE

BACKGROUND OF THE INVENTION

1. Field of the Invention

The present invention relates to a linear guide device using the rolling movements of balls.

2. Description of the Related Art

Conventionally, as a linear guide device of this type, for example, as shown in FIG. 18, there is known an apparatus comprising a guide rail 301 elongated in the axial direction thereof and a slider 302 which is movably mounted on the guide rail 301 in such a manner that it straddles over the two side portions of the guide rail 301. In the two side surfaces of the guide rail 301, there are formed rolling element rolling grooves 303 respectively extending in the axial direction of the guide rail 301. In a slider main body 302A of the slider 302, there are formed rolling element rolling grooves (not shown) at the respective inner surfaces of the two sleeve portions 304 thereof in such a manner as to be respectively opposed to the rolling element rolling grooves 303 of the guide rail 301.

And, between the mutually opposing rolling element rolling grooves, there are rollably interposed a large number of steel balls K serving as rolling elements, and the slider 302 is able to move on the guide rail 101 along the axial direction of the guide rail 301 through the rolling movements of the balls K. As the slider 302 moves, the balls K interposed between the guide rail 301 and slider 302 roll and move to the end portion of the slider main body 302A of the slider 302. However, in order to be able to move the slider 302 continuously in the axial direction of the guide rail 301, the balls K must circulate endlessly.

In view of this, not only, within the two sleeve portions 304 of the slider main body 302A, there are further formed linear-shaped through holes (not shown) respectively extending through their associated sleeve portions in the axial direction of the slider main body 302A and serving as a rolling element passage, but also two end caps 305 are respectively disposed on the two front and rear end portions of the slider main body 302A and, in the two end caps 305, there are formed rolling element circulation passages (not shown) which are respectively curved in a semi-arc shape and allow the above-mentioned two groups of rolling element rolling grooves and the through holes serving as the rolling element passages to communicate with each other, thereby forming a rolling element endless circulation track.

Also, as shown in FIG. 19, between the two mutually adjoining ones of the balls K in the rolling element endless circulation track, a separator T including, in its two side surfaces, recessed portions W respectively opposed to the two mutually adjoining balls K is interposed in such a manner that the two balls K are respectively contacted with their associated recessed portions W of the separator T. The separators T are used to eliminate the clearances of the line of the steel balls of the rolling element endless circulation track in the circulating direction thereof to apply compression forces to the line of the steel balls, thereby enhancing the efficiency of the operation of the linear guide device.

In the above-mentioned conventional linear guide device, the rolling element endless circulation track is composed of a plurality of components. To absorb variations in the track length of each product caused by the working errors of the components as well as to forcibly apply the compression forces to the line of the steel balls, there are required specifications for a separator having a highly accurate and complicated shape (for example, a separator including an elastic portion and a movable portion). However, such separator is difficult to manufacture.

Also, in the conventional linear guide device, the separators are set such that they apply the compression force forcibly to the line of steel balls. Therefore, when an excessive compression force is applied to the line of steel balls due to the working errors of the components, the efficiency of the operation of the steel balls is greatly worsened and also there is generated a harsh grating noise.

Further, the separator T is structured in such a manner that its two outer peripheral surfaces Q are respectively formed as spherical surfaces and the two recessed portions W each formed a spherical-shaped surface are disposed in the two end portions of the separator T which are respectively in contact with the two balls K. Also, the separator T is further structured in such a manner that the radius of curvature of each of the recessed portions W to be contacted with the balls K is set larger than the radius of the ball K. Further, the condition of contact between the separator T and ball K is specified so that forces acting between them are allowed to balance well with each other.

However, in the linear guide device shown in FIG. 18, the radius of curvature of each recessed portion W of the separator T to be contacted by the ball K is larger than the radius of the ball K. Therefore, in such a curved track as shown in FIG. 7, the ball K is contacted with the recessed portion W on the inner side of the curved track to thereby press against the separator T inwardly of the curved track. Thus, the outer peripheral portion Q of the separator T is pressed against a guide member J which forms the inside track surface of the curved track. Due to this, there is generated friction between the separator T and guide member J, which worsens the operation performance of the ball K and causes noises as well as deteriorates the durability of the separator T.

On the other hand, in the rolling element endless circulation track, the balls, which have moved through a linear track (where a load is applied to the balls) formed of the rolling element rolling grooves for the purpose of linear guidance, enter a curved track formed of the rolling element circulation passages, leave this curved track, and then move through another linear track (where the balls are free from any load). And, the curved track portion (where the balls are free from any load) and the linear track portion (where the balls are free from any load) are also referred to as circulation passages.

In the linear guide device, as an apparatus aiming at enhancing the efficiency of the operation of balls, for example, there are known an apparatus which is disclosed in Japanese Utility Model Unexamined Publication No. 59-103928 of Showa (which is hereinafter referred to as the conventional example 1) and an apparatus disclosed in Japanese Patent Examined Publication No. 63-8330 of Showa (which is hereinafter referred to as the conventional example 2).

Of the two conventional examples, the conventional example 1 is structured such that, of outside guide members referred to as end caps forming the outside ball contact surfaces of the curved track in the circulation passages, the leading end portions thereof with which the balls are firstly contacted are set at positions where the outside guide members are contacted with the balls moving through the linear track while receiving a load, thereby reducing the impact of the balls against the leading end portions of the outside guide members when the balls are contacted therewith, so that the efficiency of the operation of the balls can be enhanced.

Also, the conventional example 2 is structured such that there is disposed a retainer in the entrance of each of the circulation passages so that the ball is scooped up with the retainer, to thereby reduce the impact of the ball against the circulation passage or curved track when the ball enters it from the linear track, so that the efficiency of the operation of the balls can be enhanced.

As described above, these conventional examples, in order to enhance the efficiency of the operation of the balls, aim at preventing the possibility that the balls can be arranged not in order but alternately, that is, preventing the so-called reeling movements of the balls; or, aim at achieving the smooth revolutions of the balls through the circulation track. However, these conventional examples do not aim at reducing the level of the noise caused by the collision of the balls. On the other hand, the present invention points out that the main cause of the noise produced in the conventional linear guide device including the above-mentioned circulation passages is closely related with the collisions, within the circulation passages, of the balls with the various guide members forming the circulation passages and, especially, the noise is closely related with the amount of the play allowance of the ball in an entrance portion through which the ball moves from the linear track to the curved track or in an exit portion through which the ball moves out of the curved track, in both of which the ball circulation track becomes unstable.

In other words, referring to the collision of the ball which is the main cause of the noise, in order to reduce the noise, there can be expected two methods: that is, one is to reduce the collision force of the ball; and, the other is to reduce the number of times of collisions of the ball. Here, the collision force reducing method has demerits as well for the following reasons. Thus, the invention aims at achieving not only noise level reduction but also enhanced ball operation performance by employing the method for reducing the number of times of collisions of the ball, which is easier than the former method. By the way, the most effective technique to reduce the ball collision force greatly is to decrease the mass of the ball which collides with the guide members and guide rail. However, to reduce the diameter of the ball incurs a demerit to reduce the load capacity of the linear guide device, while use of a ball having low specific gravity such as a ceramic ball involves a demerit to cause an increase in the cost of the linear guide device. Also, only to change the ball scoop-up structure is not be able to change the collision energy of the ball at all. That is, to reduce the mass of the ball does not seem to be able to provide a great effect in the noise level reduction.

In view of the above-mentioned facts, the conventional examples will be checked below in detail. In both of the conventional examples 1 and 2, the ball collision force in the scoop-up portion can be reduced to a slight degree but the number of times of collisions cannot be reduced, so that there cannot be obtained a great effect for the reduction of the noise level.

For example, in FIG. 9 which shows a portion of the conventional example, there is shown a structure in which a ball B moving within a linear track is scooped up in the leading end portion of a curved track outside guide member A, to thereby guide the ball B into a curved track, that is, a circulation passage. The ball contact surface of a curved track inside guide member C is set rather inwardly of the curved track, and the ball contact surface of the curved track outside guide member A is set rather outwardly of the curved track, thereby giving the ball B a play allowance. For example, the play allowance $D\beta$ of the ball B, which has moved by a phase $\beta$ from the linear track and is thus present in the vicinity of the entrance of the curved track and is free from any load, is larger than the play allowance $D\alpha$ of the ball B which has moved by a phase $\alpha$ from the linear track to the curved track and is thus free from any load, because there is removed the restriction by the outside guide member. That is, the ball B has, as the maximum value on the ball circulation track, the play allowance $D\beta$ equal to or larger than the play allowance $D\alpha$ of the ball B that has been initially set in design. The ball B, which has played with the maximum play allowance $D\beta$ and is now present in the vicinity of the entrance of the curved track, that is, has been displaced greatly from its original position, is then restricted to a state where the ball B is free from any load but is given the small play allowance $D\alpha$, or to the state where the ball B is given a load but any play allowance is not given. Then, the ball B will be collided with its peripheral guide members A, C and guide rail with greater shocks than the initially set design value, with the result that there can be generated the noise.

Also, in the conventional example 1, in order to achieve its structure, the guide member forming the linear track, that is, the ball rolling grooves in the guide rail must be made excessively shallow, which results in the reduced load capacity of the structure; and, due to the high accuracy of the respective parts and the high working accuracy thereof, it is very difficult to manufacture the structure employed the conventional example 1. On the other hand, in the conventional example 2, due to the high accuracy of the respective members and the severe working errors thereof, the originally expected ball scoop-up cannot be attained, which has an ill effect on the operation performance of the balls used in the structure of the conventional example 2.

SUMMARY OF THE INVENTION

The present invention aims at eliminating the drawbacks found in the above-mentioned conventional linear guide device. Accordingly, it is an object of the invention to provide a linear guide device which is able to reduce the noise positively and easily or improve separator durability while realizing enhancement in operation performance.

To solve the above object, according to the first aspect of the invention, there is provided a linear guide device including: a plurality of rolling elements; a guide rail extending in an axial direction thereof and including a plurality of rolling element rolling grooves in two side portions thereof, the rolling groove extending in an axial direction of the guide rail; a slider including a plurality of rolling element rolling grooves respectively opposed to the rolling element rolling grooves of the guide rail, the slider being supported on the guide rail in such a manner that the slider is movable along the axial direction of the guide rail through the rolling movements of the rolling elements respectively inserted between the rolling element rolling grooves of the guide rail and said rolling element rolling grooves of the slider, the slider including a rolling element endless circulation track along which the rolling elements are allowed to circulate endlessly; and a plurality of separators, each interposed between the adjoining rolling elements in the circulation direction of the rolling elements, wherein a clearance is formed between a line of the rolling elements and the separators which are endlessly circulated.

Further, according to the second aspect of the invention, there is provided a linear guide device comprising: a plurality of balls; a guide member defining a curved track which guides the balls; and a separator interposed between the adjoining balls and having concave portions in both end portions of the separator in an axial direction thereof, which respectively contacting with the spherical surfaces of the adjoining balls, wherein the separator is disposed so that the axis of the separator is parallel to or coincide with a first straight line connecting the center points of the adjoining balls, when the balls move along the curved track, the axis of the separator coincides with the first straight line connecting the center points of the adjoining balls, when the balls moves along the curved track, the separators defines a second straight line connecting the most-outer points of the concave portions in the adjoining separators interposing the ball, and passing through the center point of said interposed ball, the most-outer point being a point contacting with the spherical surface of the ball at an outer periphery side of the curved track, the outer diameter dimension of the separator having a radius equal to a distance from the outer-most point to the first straight line is set as the minimum outside dimension of the separator, and the outer diameter dimension of the separator when the outer peripheral portion of the separator is contacted with the inside guide member is set as the maximum outside dimension of the separator.

Moreover, according to the third aspect of the invention, there is provided a linear guide device comprising: a plurality of balls; a guide member defining a curved track which guides the balls; and a separator interposed between the adjoining balls and having concave portions in both end portions of the separator in an axial direction thereof, which respectively contacting with the spherical surfaces of the adjoining balls, wherein the separator is disposed so that the axis of the separator is parallel to or coincide with a first straight line connecting the center points of the adjoining balls, and the outside diameter is set 0.6–0.8 times the diameter of the ball.

Further, according to the fourth aspect of the invention, there is provided a linear guide device comprising: a plurality of balls; and a guide member defining a curved track and first and second linear tracks which guide the balls, the balls entering the curved track from the first linear track and leaving the curved track into the second linear track, wherein the play allowance of each of the balls in at least one of an entrance portion through which said ball enters the curved track and an exit portion through which said ball leaves the curved track is set smaller than the play allowance of the ball within a circulation passage where the ball is free from a load.

Moreover, according to the fifth aspect of the invention, there is provided a linear guide device comprising: a plurality of balls; and a guide member defining a curved track and first and second linear tracks which guide the balls, the balls entering the curved track from the first linear track and leaving the curved track into the second linear track, wherein the play allowance of each of the balls in at least one of an entrance portion through which said ball enters the curved track and an exit portion through which the ball leaves the curved track is set in the range of 0.5 to 11% of the diameter of said ball.

By the way, in this specification, the term "play allowance" means the allowed amount of the movement of a ball in a direction at right angles to a direction in which the ball is originally expected to move. Also, the expression "the play allowance of the ball within a circulation passage where the ball is free from a load" means, for example, in the curved track, the play allowance of the ball in a portion where the movement of the ball in a direction at right angles to the advancing direction of the ball along its circulatory track is restricted by the two inside and outside guide members, or the play allowance of the ball in a linear track portion which serves as a return passage for the ball.

BRIEF DESCRIPTION OF THE DRAWINGS

FIG. 1A is a view showing the phase position of steel balls in which the dimension of a clearance formed between steel balls and separators in the rolling element endless circulation track becomes the smallest, and FIG. 1B is a view showing the phase position of the steel ball in which the dimension of a clearance formed between the steel balls and separators in the rolling element endless circulation track becomes the largest;

FIGS. 4A to 4E are graphs showing variations in dynamic frictional forces for the respective clearance dimensions as well as variations in dynamic frictional forces when no separator is used for the conventional art and present invention;

FIG. 10 is an explanatory view of the evaluation of the respective outside dimensions of the separator with respect to the ball diameter;

DETAILED DESCRIPTION OF THE PREFERRED EMBODIMENTS

Figure 18:
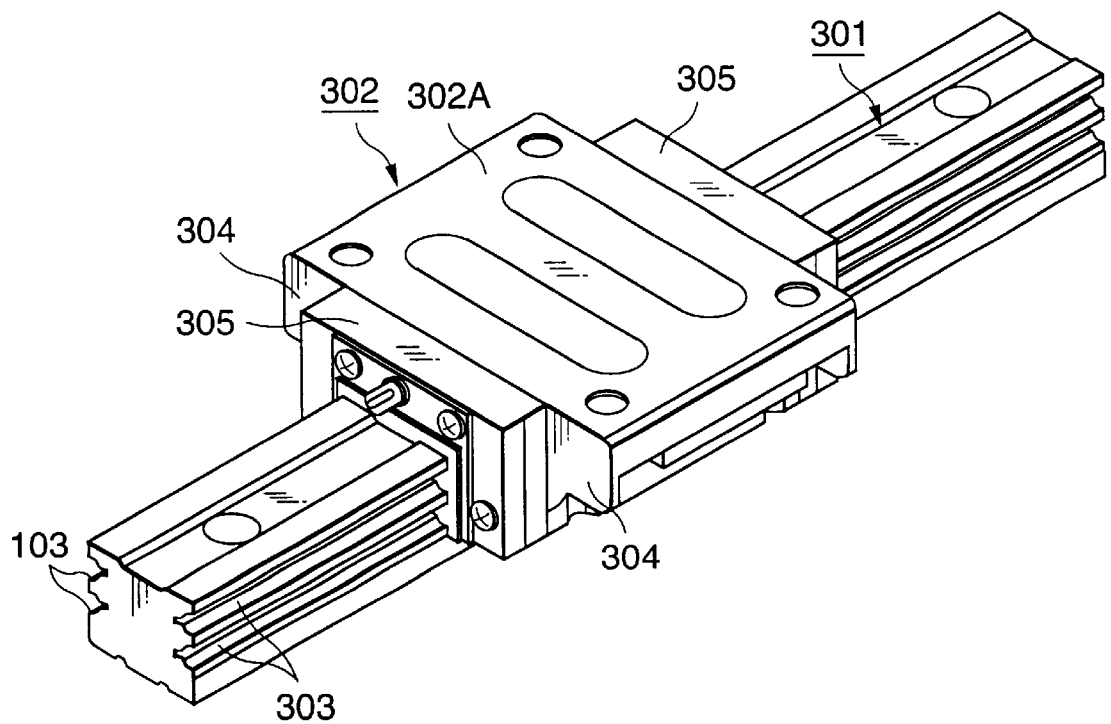
FIG. 18 is a general view of a linear guide device of the prior art.
Figure 19:
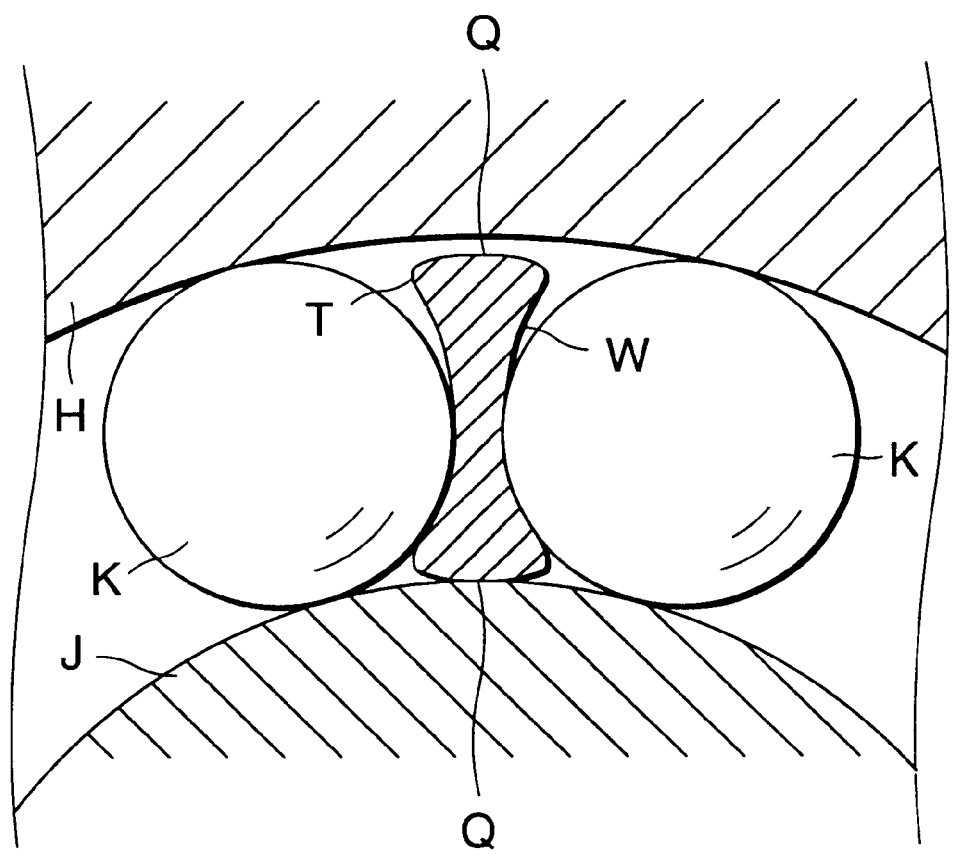
FIG. 19 is a section view of a curved track portion employed in the conventional linear guide device shown in FIG. 18.
Figure 20:
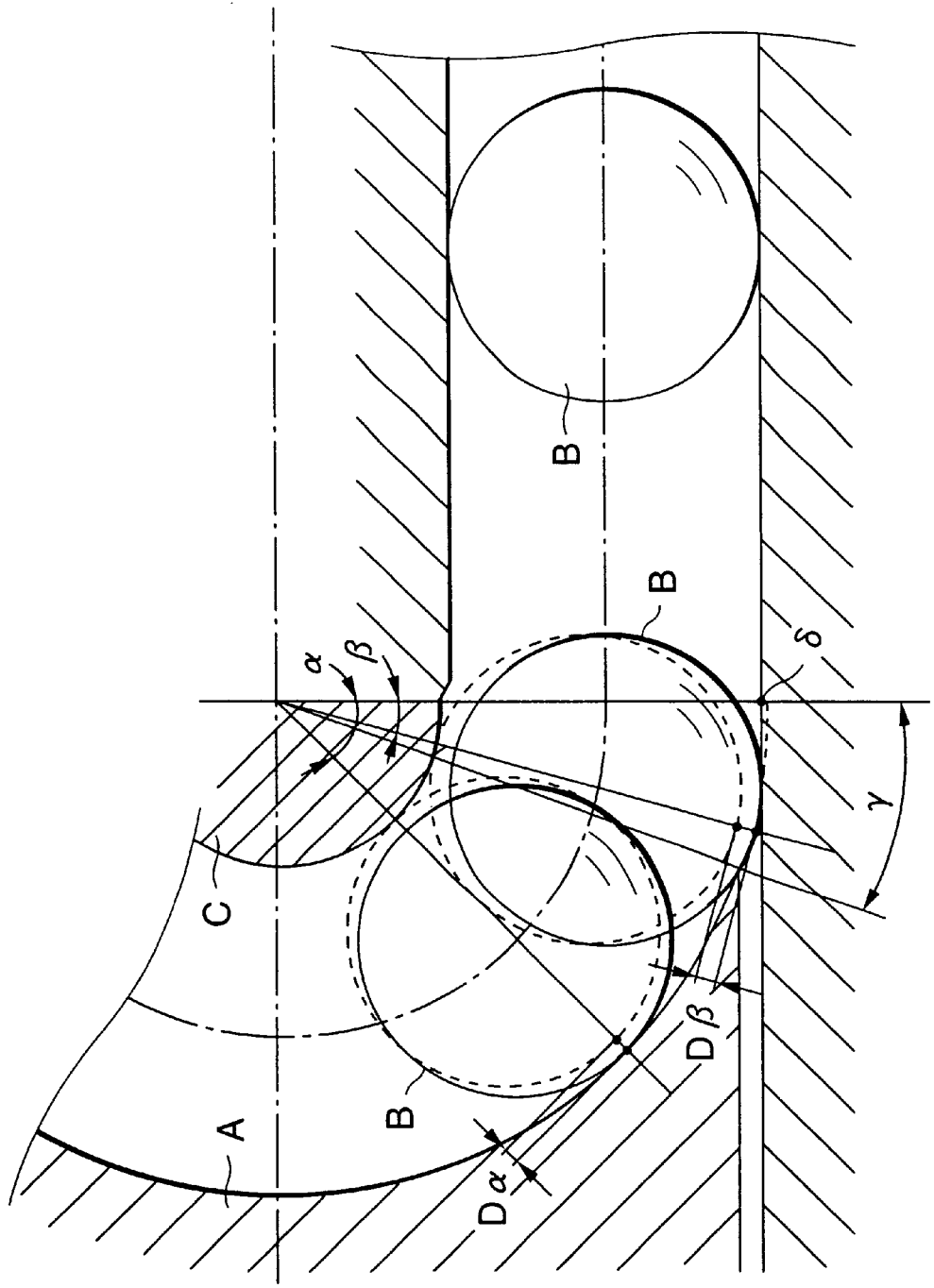
FIG. 20 is a section view of a curved track doorway portion of a conventional linear guide device.

Now, a description will be given below of a linear guide device according to a first embodiment of the invention with reference to the accompanying drawings. By the way, the linear guide device according to the first embodiment is different from the conventional linear guide device shown in FIG. 18 only in separators which are respectively disposed between mutually adjoining steel balls in a rolling element endless circulation track. Therefore, a description will be given below of only the different portions thereof.

Figure 1A:
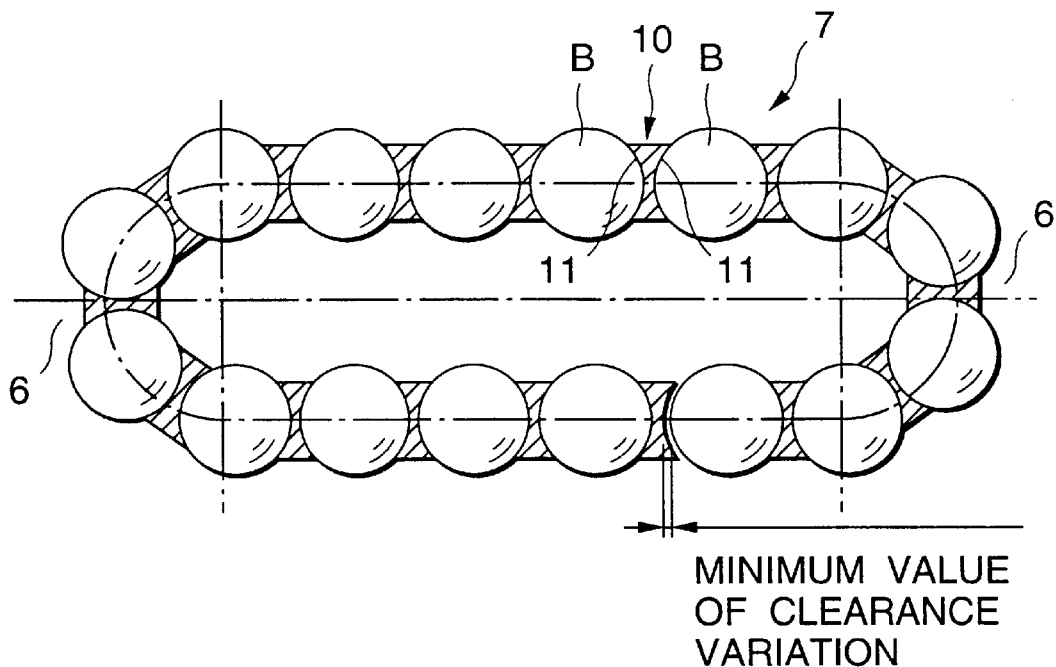
FIGS. 1A and 1B are explanatory views of a rolling element endless circulation track employed in a linear guide device according to a first embodiment of the invention.
Figure 1B:
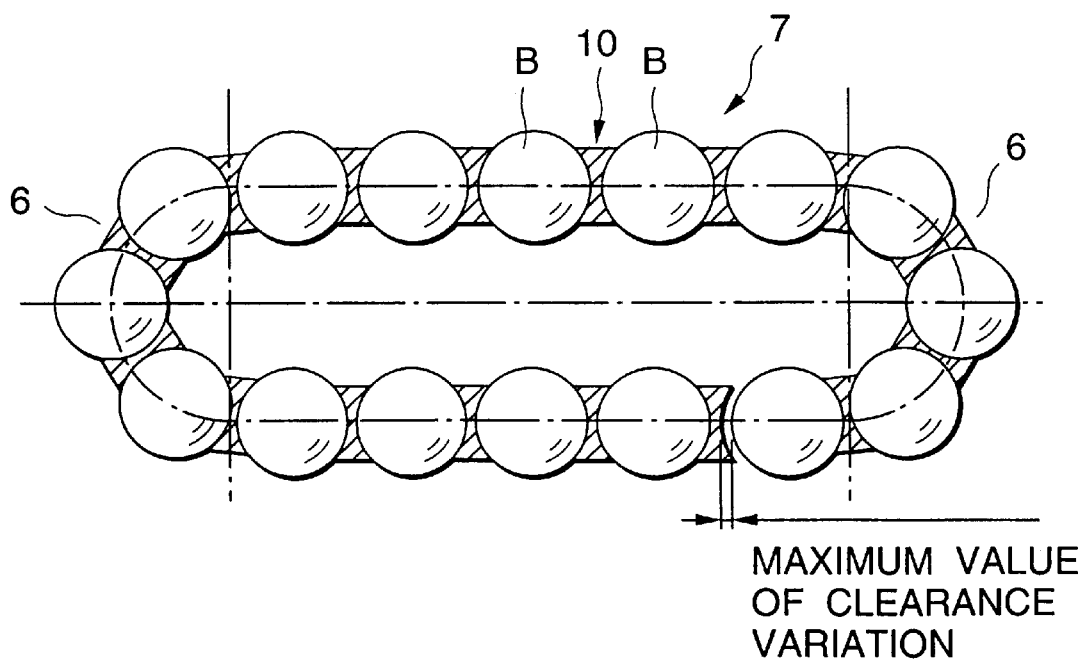
Figure 3:
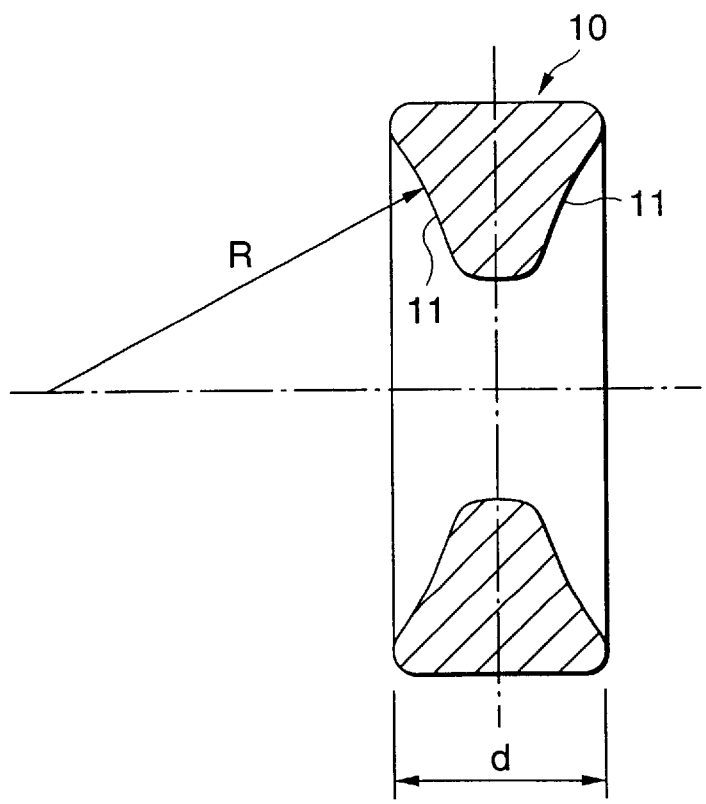
FIG. 3 is a section view of a separator according to the first embodiment of the invention.

As shown in FIGS. 1A and 1B, there are employed a plurality of separators 10 in such a manner that each separator 10 is interposed between two mutually adjoining steel balls B in the rolling element endless circulation track 7. The separator 10 is formed of material excellent in injection moldability and wear resistance, such as 66 nylon or whisker-containing 66 nylon in a short cylindrical shape. As shown in FIG. 3, in the two end faces of the separator 10 in the axial direction thereof, there are formed concave surfaces 11 each having a radius of curvature R approximate to the radius of the steel ball. In the conventional structure, the concave surface 11 is contacted with the ball B to hold the steel ball B as well as there are eliminated clearances in the line of steel balls, so as to apply the compression force to the line of steel balls. On the other hand, in the present embodiment, there are formed a clearance in the line of steel balls B and the separators 10, and the thickness d of the separator in the axial direction is set in such a manner that the clearance and a span between the steel balls B can respectively provide proper values.

Here, as can be understood from FIGS. 1A and 1B, the dimension of the clearance formed between the steel balls B and separators 10 in the rolling element endless circulation track 7 varies in accordance with the phases of the steel balls B. In this embodiment, at the position (the position shown in FIG. 1A) of the phase of the steel balls B where the dimension of the clearance between the steel balls B and separators 10 becomes the smallest, the dimension of the clearance is set in the range of 2% to 63% of the diameter of the steel ball B. The clearance dimension in this range is regarded as a proper value.

Figure 2:
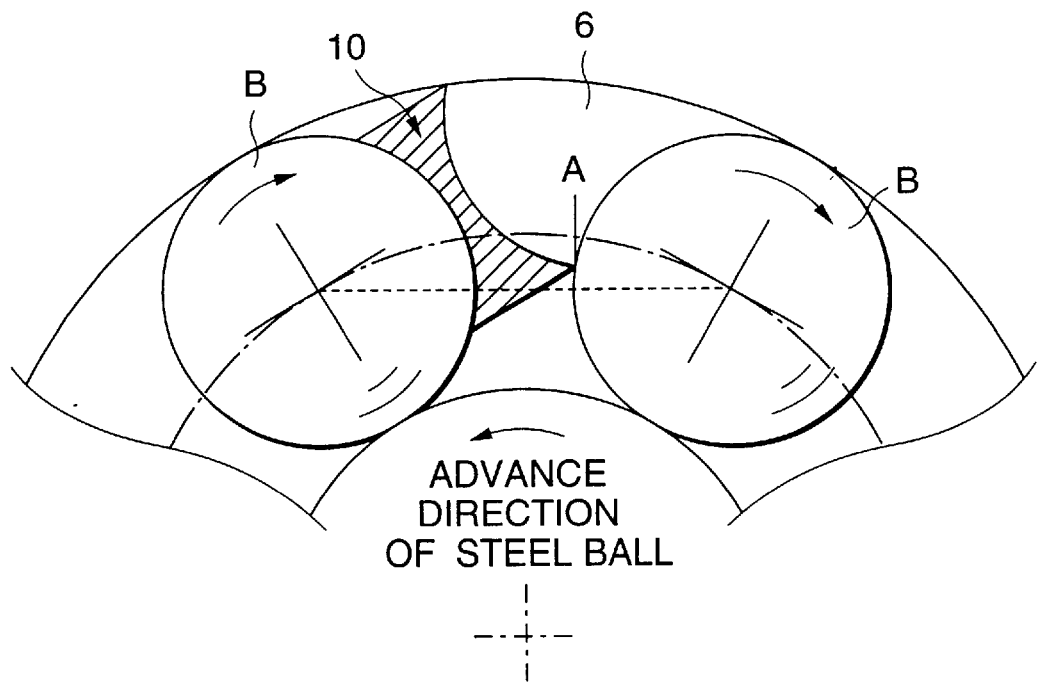
FIG. 2 is an explanatory view of an undesirable condition caused when the dimension of a clearance formed between the steel balls and the separator becomes excessively large in the conventional art.

In case where the dimension of the clearance exceeds 63% of the diameter of the steel ball B, the dimension of the clearance becomes too large and, as shown in FIG. 2, there is a possibility that the separator 10 can fall down in the semi-arc shaped rolling element circulation passage 6 of the rolling element endless circulation track 7 and thus the outer peripheral edge (the boundary portion of the concave surface and the outer peripheral surface) A of the end face of the separator 10 on the clearance side thereof can be situated upwardly of a straight line (a portion shown by a dotted line in FIG. 2) connecting the two adjoining steel balls B to bite into the steel ball B in a wedge-like manner, thereby worsening the operation performance of the linear guide device.

On the other hand, in case where the dimension of the clearance is less than 2% of the diameter of the steel ball B, the clearance dimension becomes too small and, therefore, there is a possibility that, due to variations in the clearance of the line of steel balls caused according to the phases of the steel ball B, an excessive compression force can be applied to the steel balls line, thereby worsening the operation performance of the linear guide device.

By the way, while the proper range of the clearance dimension (that is, 2% to 63% of the diameter of the steel ball B) is obtained experimentally based on the geometrical relation, the lower limit value of the proper range (that is, 2% of the diameter of the steel ball B) is almost identical with a calculational value; and, on the other hand, the upper limit value (63% of the diameter of the steel ball B) is about twice as large as a calculational value. This is because, practically, all clearances can hardly concentrate on a portion in the line of steel balls but the clearances are arranged scatteringly between the steel balls B to a certain degree.

Now, FIGS. 4A to 4D respectively show the actually measured results of variations in the dynamic frictional forces when the values of the clearance dimension/steel ball diameter are set as 0, 0.27, 0.8, and 1.0, and FIG. 4E shows the actually measured results of variations in the dynamic frictional force when no separator is used. Also, FIG. 5 shows the relationship between the clearance dimension/steel ball diameter and the maximum variation component.

Figure 5:
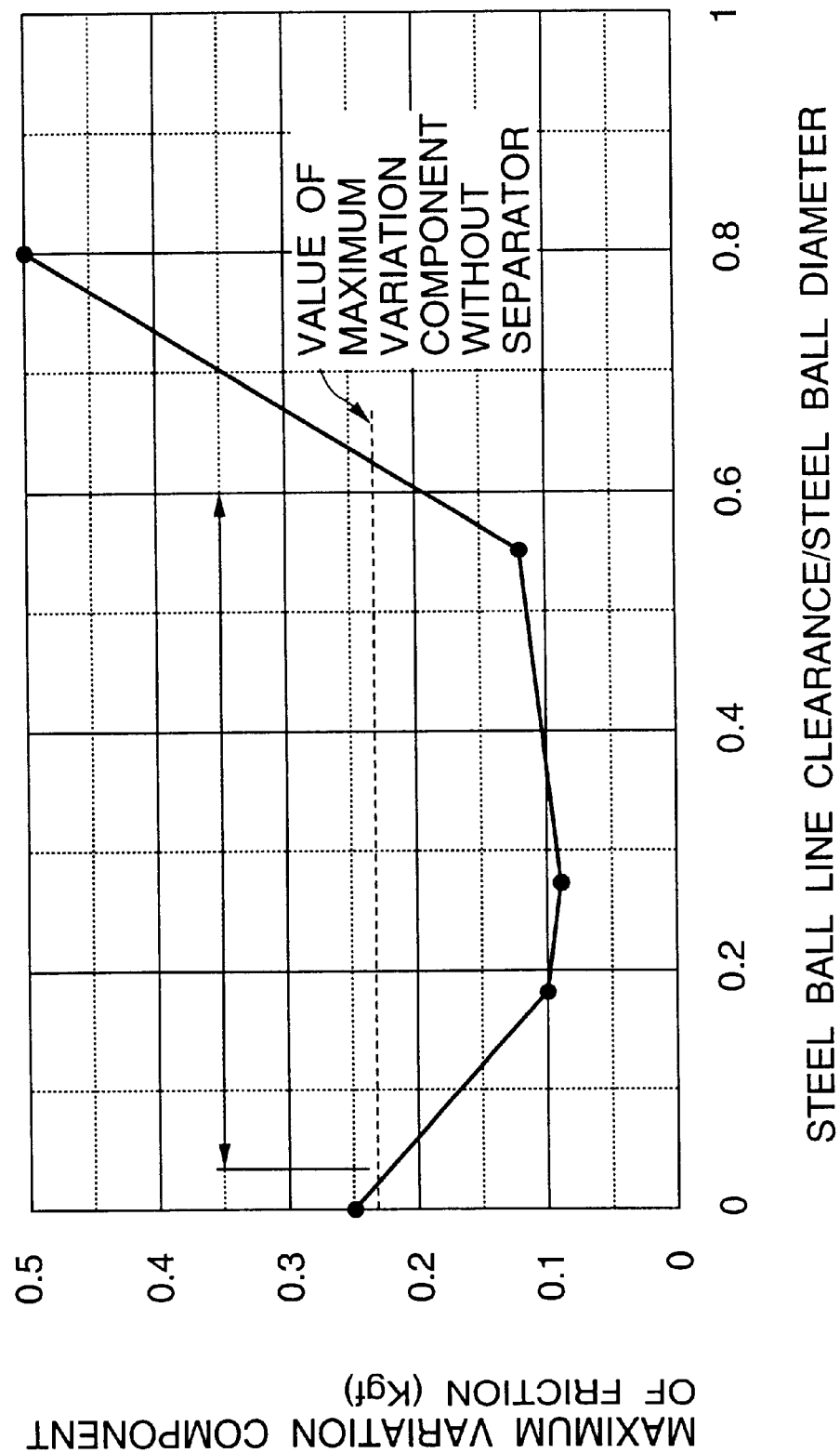
FIG. 5 is a graph of the relationship between the clearance dimension and the maximum variation component.

As can be seen clearly from FIG. 5, since the value of the maximum variation component when no separator is used is of the order of 0.23 kgf, in case where a condition when the separators are used is assumed to be lower than this, it can be understood that the clearance dimension between the separators 10 and steel balls B may be preferably set in the range of 2% to 63% of the diameter of the steel ball B.

AS described above, in the present embodiment, since there are formed clearances in the line of steel balls, even if there are found working errors in the respective components which form the rolling element endless circulation track 7, it is possible to prevent an excessive compression force from being applied to the line of steel balls. Accordingly, not only a good operation performance can be provided but also noise reduction can be realized.

Also, it is not necessary to provide the elastic portion or movable portion in the separator 10, but the separator 10 may have a simple shape, so that the separator 10 can be manufactured easily and at a low cost.

By the way, in the above-mentioned embodiment, there is taken a case in which, between two mutually adjoining steel balls, there is interposed an independent separator 10. However, this is not limitative but, of course, even in a case where separators 10 are connected to one another, there can be obtained similar operation and effects by setting a clearance in the above-mentioned proper range.

Also, in this embodiment, there is employed a cylindrical-shaped separator 10. However, the invention is not limited to this but there can be employed separators having different shapes, for example, a separator having a cylindrical shape.

Further, in the above embodiment, the shape of the concave surface 11 of the separator 10 is set as an R shape having a curvature approximate to the radius of the steel ball. However, this is not limitative but, for example, the shape of the concave surface 11 may also be a conical shape or a Gothic arch shape.

As can be clearly understood from the foregoing description, there can be obtained an effect that enhancement in operation performance as well as noise reduction can be realized positively and easily at a low cost.

Now, a description will be given below of a linear guide device according to a second embodiment of the invention with reference to the accompanying drawings.

Figure 6:
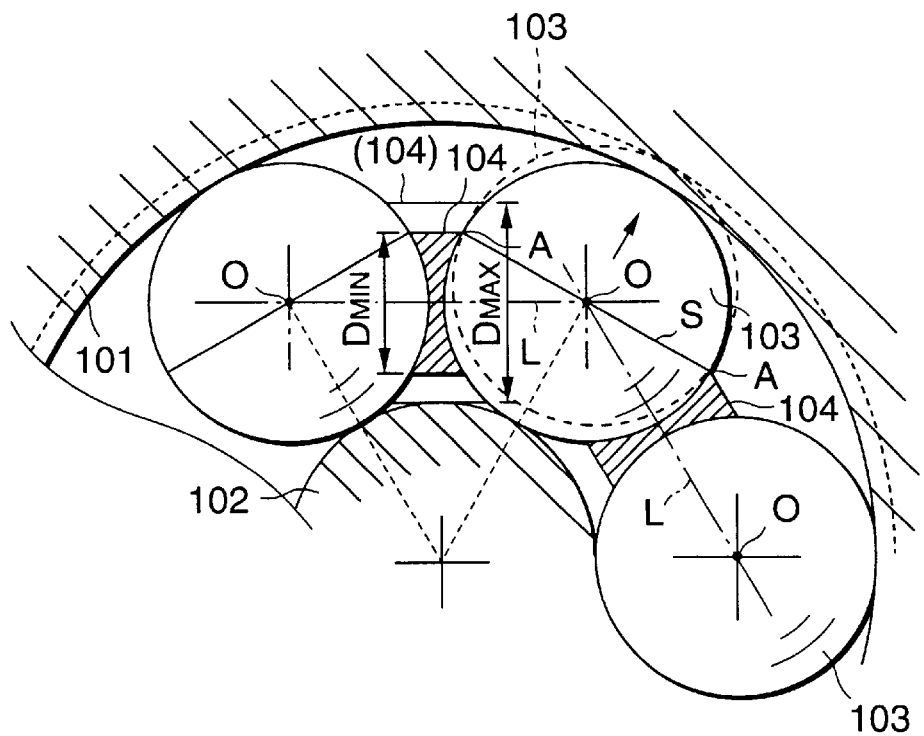
FIG. 6 is a section view of a curved track portion of a linear guide device according to a second embodiment of the invention.

FIG. 6, shows a curved track portion of balls 103, which is composed of an outside guide member 101 called an end cap and an inside guide member 102 called a return guide. Each ball 103, which has moved through a linear track, is turned by 180° in its direction at the curved track portion and is then allowed to move again through a different linear track. The ball contact surface of the inside guide member 102 forming the curved track is formed as a simple semi-arc shape which is concentric with the ball contact surface of the outside guide member 101.

In the present embodiment, a column-shaped separator 104 is interposed between two mutually adjoining balls 103 in such a manner that the axis L of the separator 104 is coincident with a straight line connecting together the respective centers O of the two mutually adjoining balls 103. Each separator 104 includes two concave surface portions which are respectively formed at the two end portions of the separator 304 in the axial direction thereof; and, each of the concave-surface portions is formed as a spherical-surface recessed portion having a radius of curvature equal to the radius of curvature of the spherical surface of the ball 103. However, the shape of the concave-surface portion is not limited to this and there can be employed any one of other proper shapes, provided it is formed in such a manner that at least a portion of the concave-surface recessed portion of the separator 104, which is located in the vicinity of the outer peripheral portion thereof, can be contacted with the spherical surface of the ball 103. And, the shape of the main body of the separator 104 is not always limited to the column shape but it may also be a hollow cylindrical shape, or a spherical shape. What is necessary, as will be discussed later, is that the shape of the separator 104 allows the separator 104 to hold the ball 103 easily and increase the allowance of holding of the ball 103 by the separator 104. In view of the above-mentioned condition, with regard to the shape of the separator 104, the outer peripheral surface of the separator 104 has an advantage in a solid cylindrical shape compared with a spherical shape. Further, it is also advantageous to employ such a shape that the balls 103 can be contacted with the concave surfaces of the concave-surface recessed portion of the separator 104, which are located in a position closer to the outer peripheral portions thereof.

And, in the second embodiment, the outer diameter of the outer peripheral portion of the separator 104 is defined in the following manner. That is, the radius of curvature of each of the two spherical-surface recessed portions respectively formed in the two end portions of the separator 104 in the axial direction thereof is set equal to, for example, the radius of curvature of the spherical surface of the ball 103. Further, the axis L of the separator 104 is set so as to coincide with a straight line which connects together the center points O of the two mutually adjoining balls 103.

This definition keeps the relative position relationship between the ball 103 and separator 104 to thereby restrict or prevent the separator 104 or ball 103 from moving out of position. When looking at this requirement from a different aspect, assuming that, while the ball 303 is moving the curved track, the outer-most points A of the curved track, at which the two spherical-surface recessed portions respectively formed in the two end portions of the separator 104 in the axial direction thereof are in contact with the spherical surface of the balls 103, are connected by a straight line S. And, the outside dimension of the separator 104 having a radius, which is equal to a distance from the points A to the straight line connecting together the center points of the two mutually adjoining balls 103 when the straight line S passes through the center point of the ball 103 interposed between the two mutually adjoining separators 104, is set as the minimum outer diameter dimension $D_{MIN}$. The actual outside dimension of the separator 104 must be larger than the minimum outer diameter dimension $D_{MIN}$. In the curved track portion through which the ball 103 is allowed to circulate with no load, there is generally formed a clearance (play allowance) with respect to the ball 103 in view of the smooth circulation of the ball and an allowable dimension accuracy. And, in some cases, the ball contact surface of the outside guide member 101, as shown by a broken line in FIG. 6, is set rather outwardly of an ideal curved track. In such case, in case where the outside dimension of the separator 104 is smaller than the minimum outer diameter dimension $D_{MIN}$, when the ball 103 comes into contact with the ball contact surface of the outside guide member 101 as shown by the broken line in FIG. 6, the separators 104 are unable to hold the ball 103 between them within the curved track portion and thus the ball 103 slips off the separators 104. As a result of this, not only the position relationship between the ball 103 and separator 104 is varied but also the respective contact conditions of the ball 103 with the separators 104, outside guide member 101 and inside guide member 102 are varied, which results in the generation of noises and deteriorated operation performance of the ball as well as the shortened durability of the separator. In view of this, in the second embodiment, the outside dimension of the separator 104 is set as a value larger than the minimum outer diameter dimension $D_{MIN}$ that is defined in the above-mentioned manner.

On the other hand, the allowable maximum outside dimension D a of the separator 104 is restricted by its interference with the guide members, especially by the inside guide member 102. That is, in the second embodiment, since the axis of the separator 104 is set so as to coincide with the straight line connecting together the center points O of the two mutually adjoining balls 103, in case where the outside dimension of the separator 104 is set large, the outer peripheral portion of the separator 104 approaches the inside guide member 102. And, if the outside dimension of the separator 104 is excessively large, then the separator 104 and inside guide member 102 interfere with each other. If the separator 104 is contacted with the inside guide member 102, similarly to the above-mentioned case, there are generated noises as well as the operation performance of the ball and the durability of the separator can be lowered. Therefore, the allowable maximum value $D_{MAX}$ of the outside dimension of the separator 104 is a value at which the separator 104 comes into contact with the guide members.

However, to increase the outside dimension of the separator 104 means to increase the surface of the separator 104 to be contacted with the ball 103 and to increase the holding allowance of the separator 104 for holding the ball 103, which can enhances the stable ball holding ability of the separator 104: that is, the larger the outside dimension of the separator 104 is, the more advantageous. Thus, in case where this is viewed from the opposite side, for example, in case where the radius of curvature of the ball contact surface of the inside guide member 102 is set large, even if the outside dimension of the separator 104 is set larger than the above-defined value, there is eliminated the possibility that the outer peripheral portion of the separator 104 can come into contact with the inside guide member 102.

Next, a description will be given below of a third embodiment of a linear guide device in which the outer diameter dimension of the separator 104 is set as large as possible as described above with reference to FIGS. 7 and 8.

Figure 7:
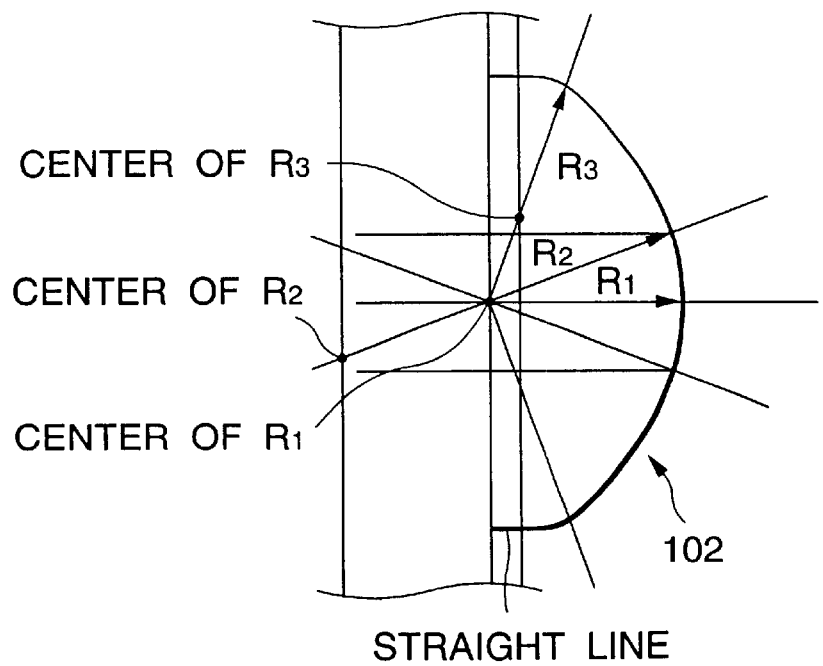
FIG. 7 is an explanatory view of an inside guide member of a linear guide device according to a third embodiment of the invention.
Figure 8:
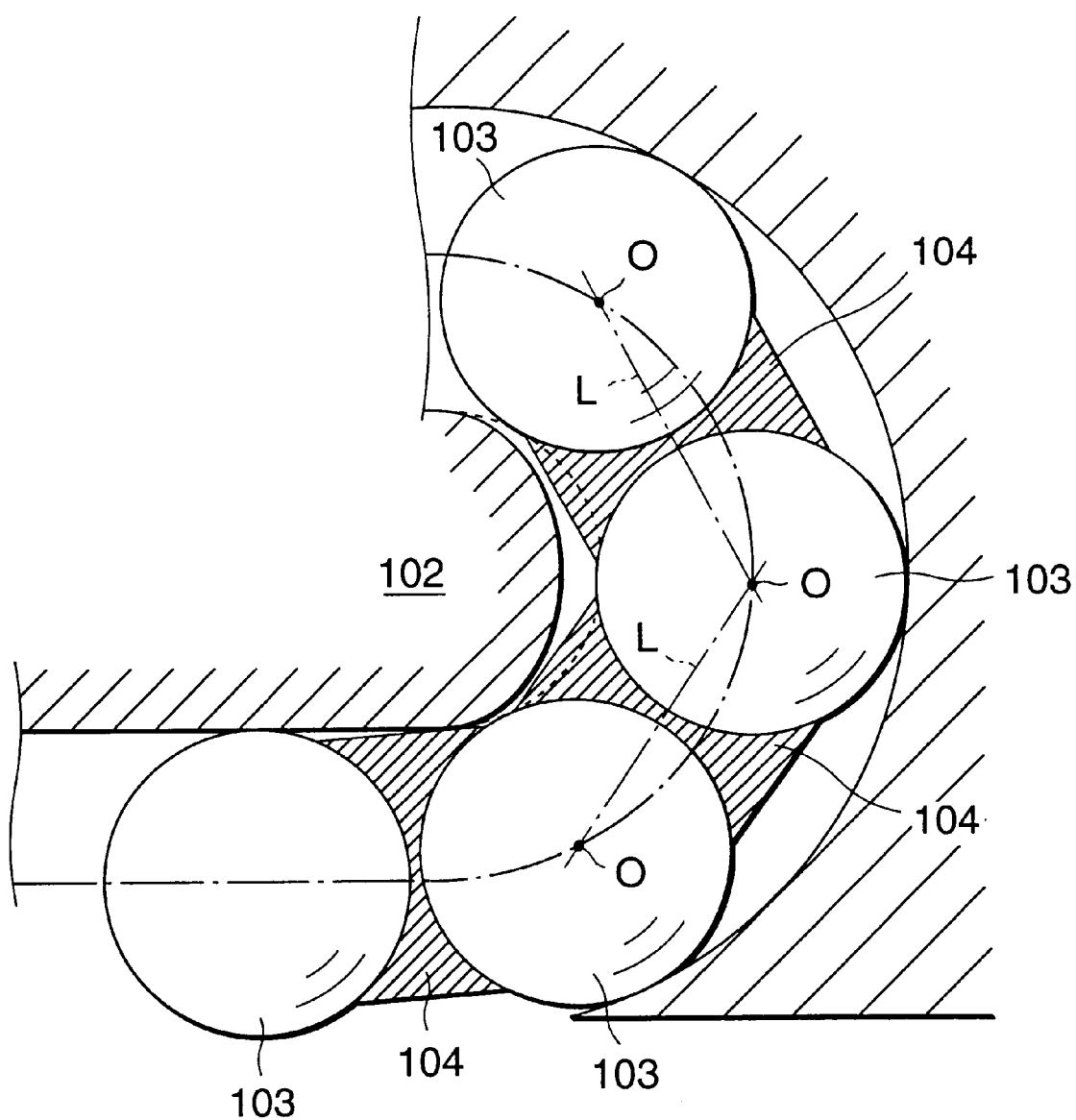
FIG. 8 is a section view of a curved track portion which is structured with the inside guide member shown in FIG. 7.

In the third embodiment, the axis L of the separator 104 is set so as to coincide with the straight line connecting together the center points O of the two mutually adjoining balls 103 as well as the second embodiment. Thus, when the outer diameter dimension of the separator 104 is increased, as shown in FIG. 8, in the doorway of the curved track, the outer diameter of the present separator 104 can be made to increase on until the outer periphery of the separator 104 comes into interference with the inside guide member 102. In this manner, in case where the shape of the inside guide member 102 is designed from a simple semicircular shape to such a shape as shown in FIG. 7, the outer diameter of the separator 104 can be made larger than that employed in the second embodiment. Besides this, there is also available a technique in which the curved track itself is made large; however, this technique also has a demerit that the linear guide device itself increases in dimension in the transverse direction thereof.

Here, there is taken an example of the shape of the ball contact surface of the inside guide member 102. That is, the shape of the ball contact surface of the inside guide member 102, which, when the outside dimension of the separator 104 is set in the above-mentioned manner, prevents the inside guide member 102 from coming into contact with the outer peripheral portion of the separator 104, is firstly defined by two upper and lower sections having a radius $R_2$ which are respectively shown in FIG. 7. The two radius $R_2$ upper and lower sections are respectively connected by a relatively small radius $R_3$ to the linear track portion of the ball 103. Further, the two main ball contact surfaces formed or defined by the radius $R_2$ are smoothly connected to each other by a relatively small radius $R_1$.

Thanks to this structure, as shown in FIG. 8, the ball contact surface of the inside guide member 102 is moved more inwardly to the curved track than that shown by a broken line in FIG. 8, which prevents the outer peripheral portion of the separator 104 having the above-mentioned allowable maximum outer diameter dimension from coming into touch with the inside guide member 102. In this case, the ball 103 is restricted by the ball contact surface of the outside guide member 101 and the spherical-shaped recessed portion of the separator 104, so that the ball 103 can be held stably. In addition, the shape of the ball contact surface of the inside guide member 102 can also be set by a combination of, for example, a straight line and an ellipse.

Figure 9D:
FIGS. 9A to 9E are explanatory views showing variations in frictional forces used to evaluate the operation performance of the separator by the outside dimensions of the separator with respect to the diameter of a ball in the conventional art and the present invention.
Figure 9E:
Figure 9A:
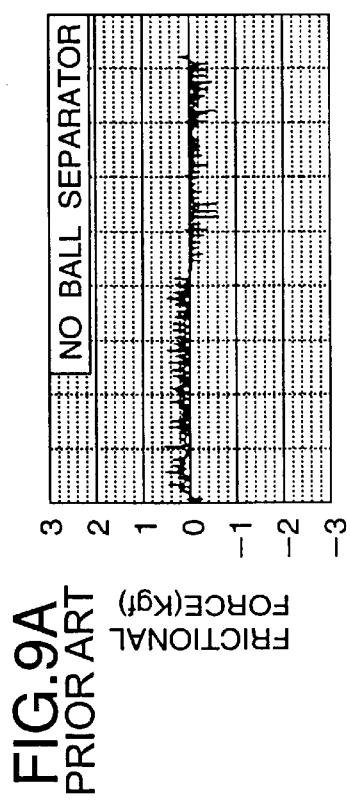
Figure 9B:
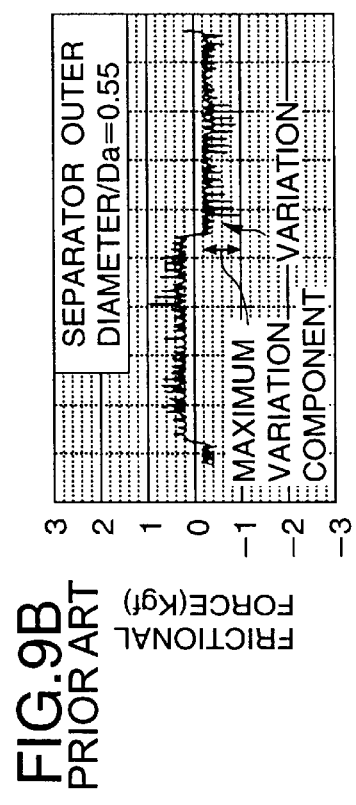
Figure 9C:
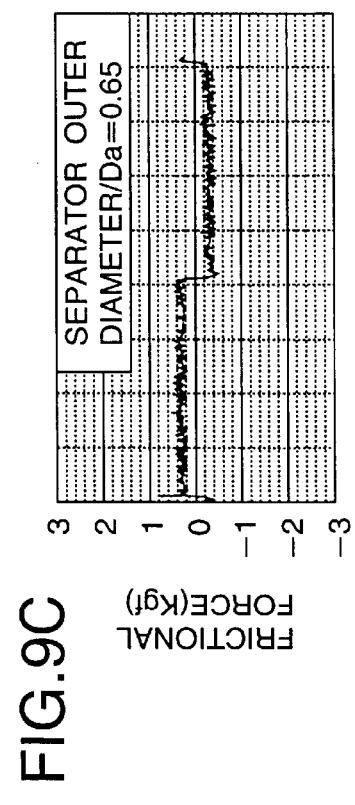

Next, a description will be given below of the range of the substantial outside dimension of the separators respectively shown in the second and third embodiments with respect to, for example, the outer diameter of the ball. Here, as the evaluation of the operation performance of the ball depending on the outside dimension of the separator, in FIGS. 9B to 9E, there are shown frictional forces respectively obtained when the outside dimensions of the separator are set 0.55 times, 0.65 times, 0.75 times and 0.85 times the diameter of the ball. Also, in FIG. 9A, there is shown a frictional force when no separation is used. Of the variations in the frictional forces respectively shown in these figures, FIG. 9B shows a sharp variation which is referred to as a beard. The sizes of the maximum variation components (the maximum beard components) in the respective outside dimensions of the separator are compared with one another, and the comparison results are shown in FIG. 10. From the fact that the size of the maximum variation component in the absence of the separator is of the order of 0.5 kgf, it is found that, in case where the condition for use of the separator is set equal to or less than this size, the outside dimension of the separator may be set preferably in the range of substantially 0.6 to 0.8 of the diameter of the ball.

As can be seen obviously from the second and third embodiment, while balls are moving along a curved track, the axis of a separator is made to coincide with a straight line connecting together the center points of the two mutually adjoining balls interposing the separator. Further, while the balls are moving along the curved track, two points, which are present on the curved track and provide the outer-most points of the concave-surface portions of two separators which adjoin each other with any one of the balls interposed between them and are respective contacted with the spherical surface of the thus held ball, are connected together by a straight line. Then, the outer diameter dimension of a separator having a radius equal to a distance from the outer-most point to a straight line connecting the center points of the two mutually adjoining balls when the straight line connecting between the outer-most points passes through the center point of the ball held by the two mutually adjoining separators is set as the minimum value of the outside dimension of the present separator, whereby the position of the ball moving along the curved track can be restricted accurately. In combination with this, the outer diameter dimension of a separator when the outer periphery of the separator comes into contact with the guide member forming the curved track is set as the maximum value of the outer diameter dimension of the separator, so that, in a range in which the separator is prevented from coming into contact with the guide member, the outer diameter dimension of the separator can be increased to thereby be able to enhance the ball holding function of the separator, enhance the operation performance of the ball, reduce the level of noises caused by the ball, and enhance the durability of the separator.

Figure 11:
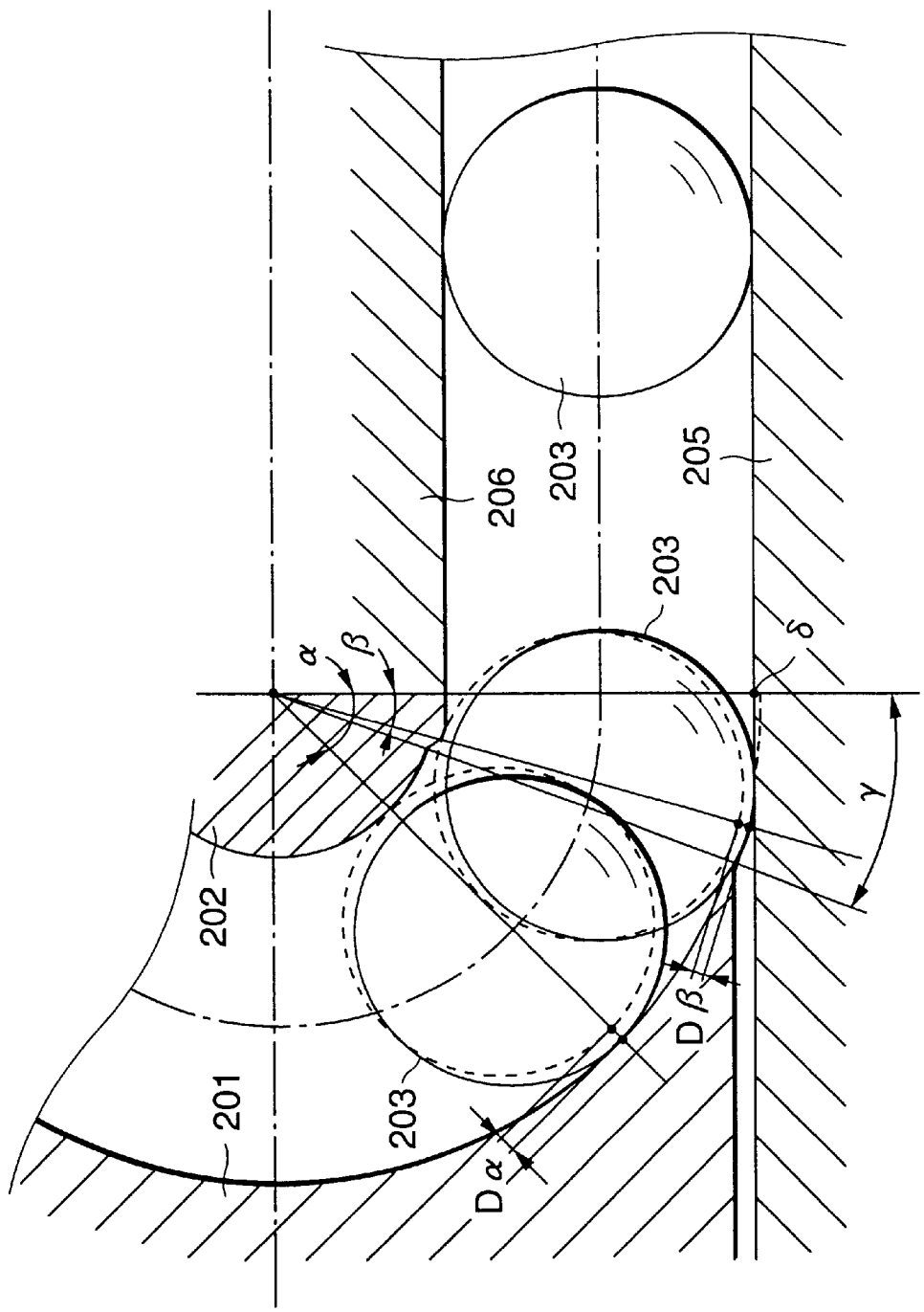
FIG. 11 is a section view of a curved track doorway portion of a linear guide device according to a fourth embodiment of the invention.

Next, a description will be given of a fourth embodiment of the invention with reference to the accompanying drawings. Specifically, FIG. 11 is an explanatory view of a connecting portion between a linear track portion and a curved track portion for a ball (steel ball) 203. The linear track portion is composed of a linear track inside guide member 205 called a rail and a linear track outside guide member 206 called a bearing. The curved track portion is composed of a curved track outside guide member 201 called an end cap and a curved track inside guide member 202 called a return guide. In this embodiment, the ball 203 moved through the linear track enters the curved track, and then the ball 203 is turned by 180°, so that the ball leaves the present curved track and moves again through another linear track. Therefore, here, the curved track portion forms part of a circulation passage. By the way, according to the present embodiment, the linear track outside guide member 206 and curved track inside guide member 202 are formed separately from each other. Also, the end portion of the curved track outside guide member 101 on the linear track side thereof is sharpened, and the sharpened leading end portion of the curved track outside guide member 201 is inserted into the inside portion of the linear track inside guide member 205, whereby the ball 203 moving through the linear track can be guided and scooped up into the curved track. Also, the ball contact surface of the curved track outside guide member 201 is formed in a simple semi-arc shape.

In the present embodiment, except for the portions of the curved track outside guide member 201 and curved track inside guide member 202 where the ball 203 is positioned in a phase γ after the ball 203 has moved from the linear track to the curved track (that is, after the ball 203 has passed through a point δ shown in FIG. 11), similarly to the conventional art, the ball contact surface of the curved track inside guide member 202 is set rather inwardly of the curved track, the ball contact surface of the curved track outside guide member 201 is set rather outwardly of the curved track. Further, there is formed the same play allowance Dα as the play allowance in the conventional art in a direction at right angles to the original moving direction of the ball 203.

And, in the conventional examples, at the same time when the ball has moved from the linear track to the curved track, the ball contact surface of the curved track inside guide member 202 is set rather inwardly of the curved track. However, on the other hand, according to the present embodiment, while the ball is present in the phase γ from the transition point δ between the linear track and the curved track, that is, until the time when the ball 203 is substantially scooped up by the curved track outside guide member 201, the ball contact surface of the curved track inside guide member 202 is set more outside than in the conventional examples. Due to such setting, the ball play allowance Dβ in the curved track doorway in this phase β where the ball play allowance conventionally provides the maximum value (Dα or more) is smaller than the play allowance Dα of the ball 103 within the circulation passage in which no load is applied to the ball. Here, the term "the curved track doorway" means, of an angular range from a straight line connecting the center of the curved track inside guide member 202 with the point of the curved track outside guide member 201, where the scoop-up of the ball 203 is started, to the contact surface of the curved track outside guide member 201 with respect to the end face of the linear track outside guide member 206, that is, of the angular range of the phase γ, in particular, a portion where the ball 203 is scooped up by the curved track outside guide member 201. In this manner, in case where the play allowance Dβ of the ball 203 in the curved track doorway is set small, the play of the ball in this portion is small, that is, the displacement from the ball original position is small. Thus, the number of times that the ball 203 is collided with the curved track outside guide member 201, the curved track inside guide member 202 and linear track inside guide member 105 before and behind such curved track doorway is reduced, thereby the noise involved with the collisions of the ball is also reduced. Also, without increasing the number of parts and the manufacturing cost of the apparatus, the noise can be reduced easily.

Further, especially, since the play allowances of the respective portions depend on only the relative position relationship between the curved track outside guide member 201 and curved track inside guide member 202, for example, there is eliminated the need, as in a fifth embodiment which will be discussed later, to position the linear track outside guide member 206 and curved track outside guide member 201 with high accuracy, which makes it possible not only to facilitate the assembling operation of the apparatus but also to reduce the manufacturing cost of the apparatus. By the way, the shape in which the ball contact surface of the curved track inside guide member 202 is expanded more outside than in the conventional examples is not limited to the shape shown in FIG. 11 but, for example, any other shape such as an elliptical shape, an R shape, or a combination of these shaped can be employed, provided that it allows the ball contact surface of the curved track inside guide member 102 to expand more outwardly than in the conventional examples so that the play allowance Dβ of the ball 103 in the curved track doorway portion can be made smaller than that obtained in the conventional examples.

Figure 15:
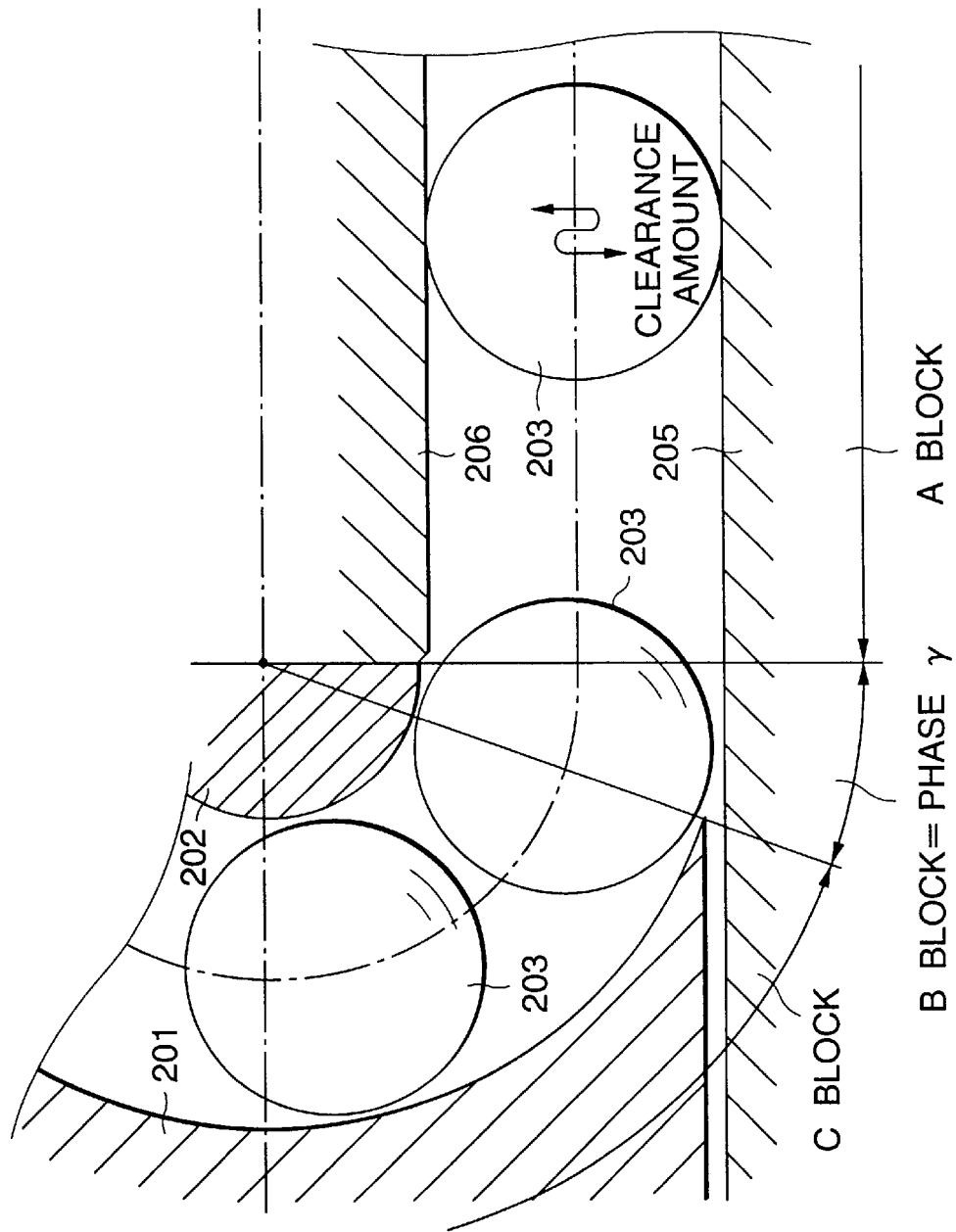
FIG. 15 is an explanatory view of ball positions and the sizes of the ball play allowances with respect to the ball diameters.
Figure 16:
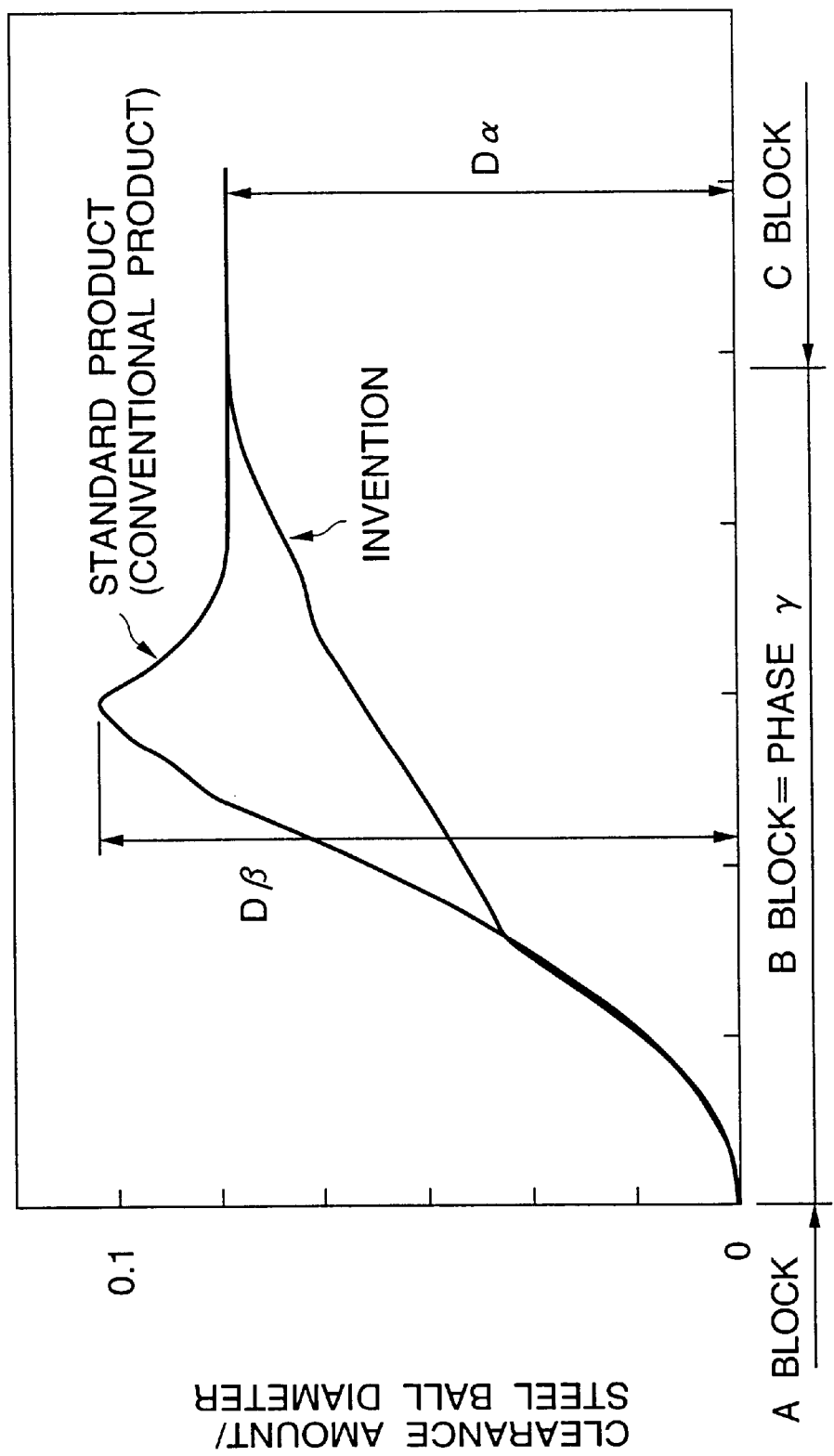
FIG. 16 is a graph of the relationship between the ball positions and the sizes of the ball play allowances with respect to the ball diameters (steel ball diameters) shown in FIG. 15.

Here, FIGS. 15 and 16 show the above-mentioned structure when it is viewed from a different point of view. In the above conventional examples, in an A block which provides the load applying side of the linear track portion, there is not formed such play allowance as shown in FIGS. 15 and 16; in a B block of the curved track portion before the ball reaches the phase γ, the play allowance of the ball becomes the maximum value; and, in a C block after the ball reaches the phase γ, the play allowance of the ball becomes a constant play allowance Dα and thus the C block provides a stable ball circulation track. On the other hand, according to the present embodiment, since the play allowance of the ball in the doorway of the curved track is set small, there is eliminated such possibility as in the conventional examples that the play allowance of the ball can have the maximum value, and the ball play allowance varies almost uniformly, so that the level of the noise caused by the collision of the ball can be reduced.

Figure 12:
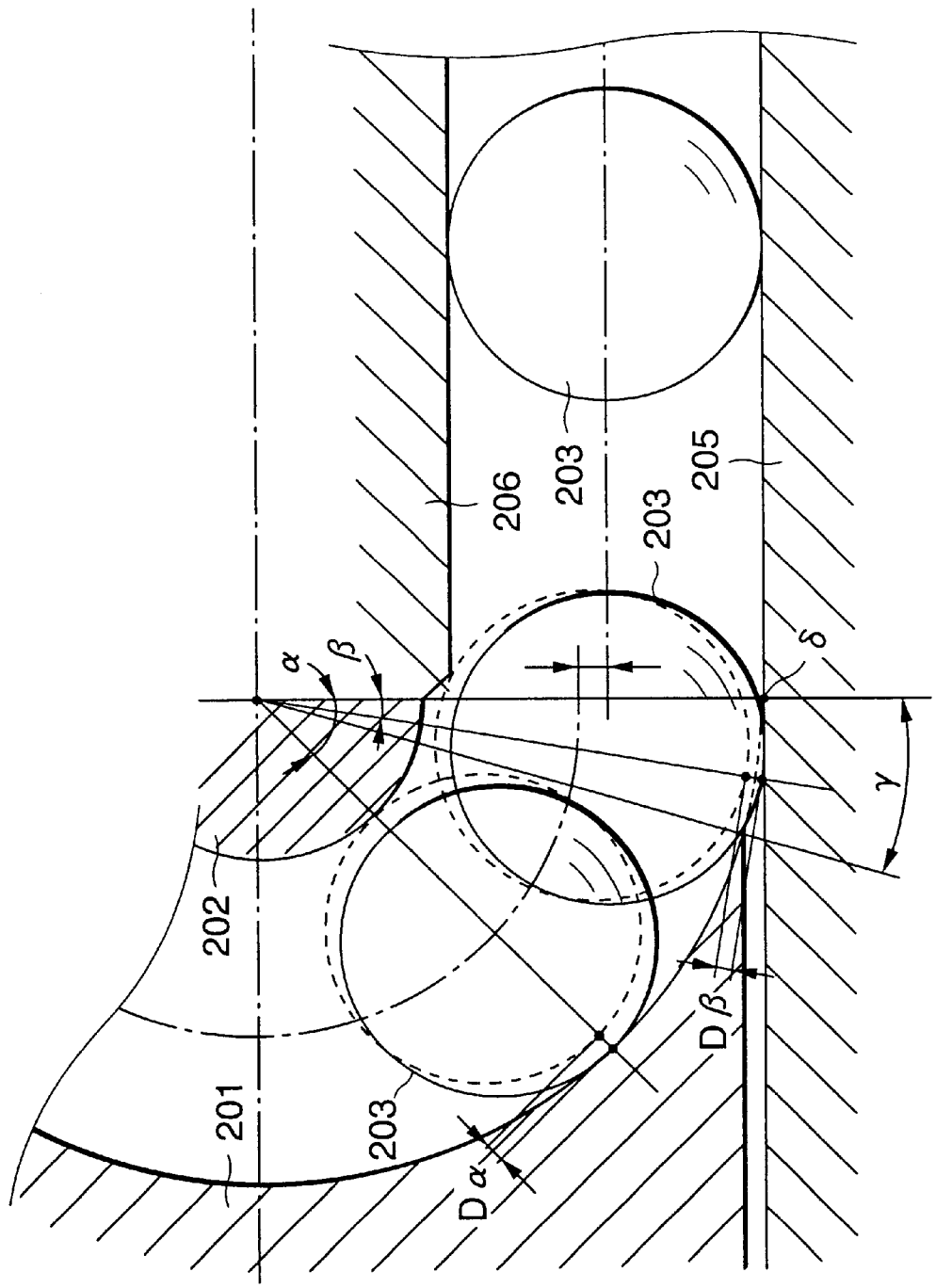
FIG. 12 is a section view of a curved track doorway portion of a linear guide device according to a fifth embodiment of the invention.

Next, a description will be given below of a fifth embodiment of a linear guide device according to the invention with reference to FIG. 12.

In this embodiment, the center axis of a curved track is displaced inwardly from the center axis of a linear track. Due to this, between a phase γ from a transition point δ transiting from the linear track to the curved track, the play allowance Dβ of the ball in a curved track doorway in an arbitrary phase β of the center of the ball can be made smaller than the play allowance Dα of the ball in a phase α after the phase γ in the curved track, where the ball is present within the circulation passage and thus the ball is free from a load. And, thanks to this setting of the ball play allowances, similarly to the fourth embodiment, the play allowance Dβ of the ball in a curved track doorway can be made smaller than that in the conventional examples, which can reduce the number of times of collisions of the balls 203 with the curved track outside guide member 201, curved track inside guide member 202 and linear track inside guide member 205, thereby being able to reduce the level of the noise involved with the collision of the ball. Also, since use of this structure does not increase the number of parts, and also since a method for working the components of the structure is neither so complicated nor so highly accurate, the level of the noise can be reduced easily while preventing an increase in the manufacturing cost of the apparatus.

Further, in this embodiment, the ball scoop-up tongue portion (the linear track side end portion of the curved track outside guide member 201) can be set at a position nearer to the linear track than in the fourth embodiment, which can reduce the number of times of collisions between the guide member, that is, the rail 205 and the ball 203, so that the noise level reduction can be realized more effectively than the fourth embodiment.

Figure 13:
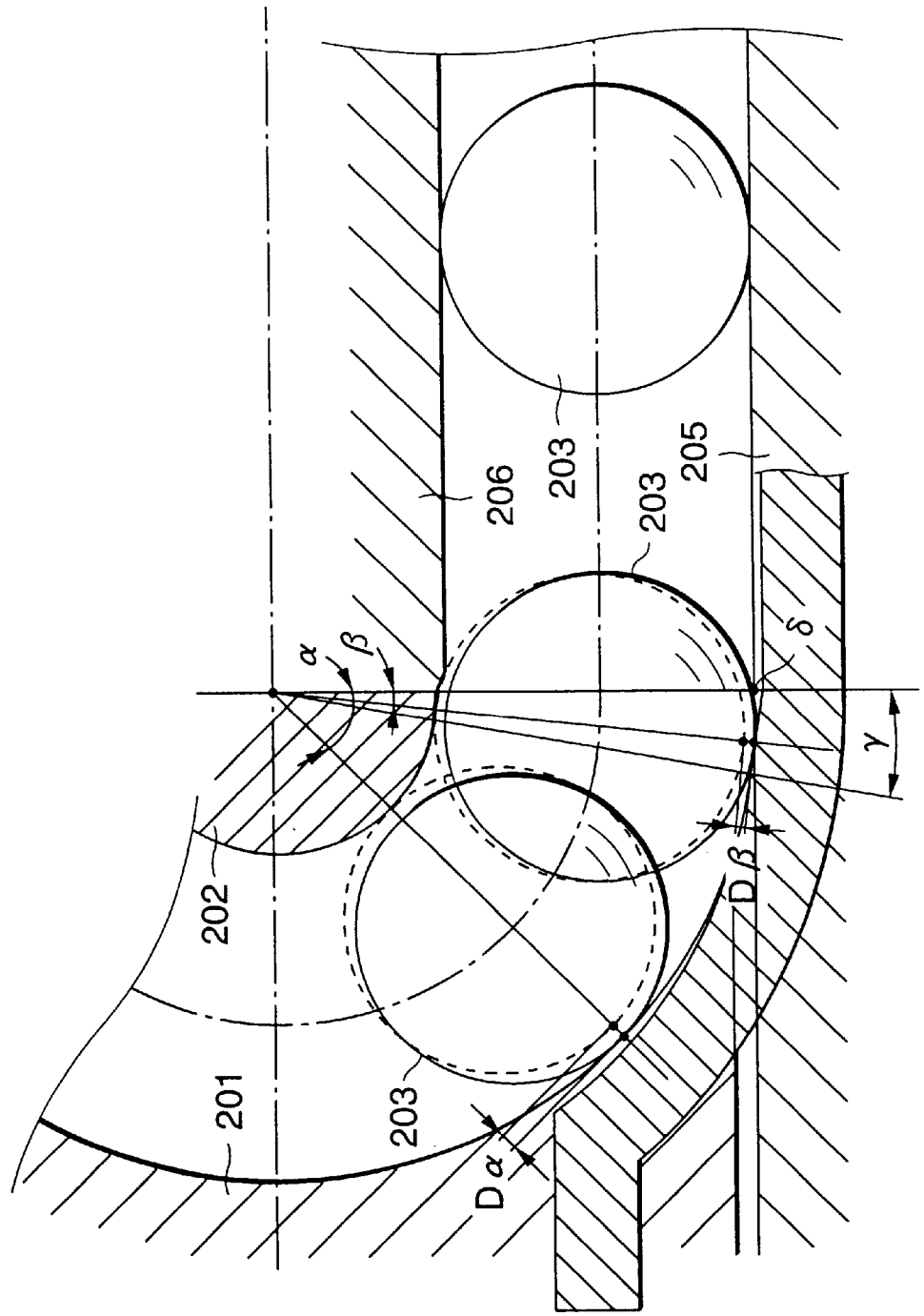
FIG. 13 is a section view of a curved track doorway portion of a linear guide device according to a sixth embodiment of the invention.

Next, a description will be given below of a sixth embodiment of a linear guide device according to the invention with reference to FIG. 13.

In this embodiment, there is disposed an intermediate inside guide member 204 which is composed of a thin metal plate, a wire or a similar member in a gap between the linear track inside guide member 205 and curved track outside guide member 201. The ball 203 is firstly scooped up by the intermediate inside guide member 204 and is then guided to the curved track outside guide member 201. That is, the ball 203 does not move directly from the linear track inside guide member 205 to the curved track outside guide member 201 but, after the ball 203 is once scooped up by the intermediate inside guide member. 204 (the position of the phase γ), the ball 203 is transferred to the curved track outside guide member 201. Therefore, because the play of the ball 203 is restricted by the intermediate inside guide member 204, the play allowance Dβ of the ball in the curved track doorway in a phase β existing in the phase γ from the transition point δ transiting from the linear track to the curved track (especially, the portion where the ball 203 is scooped up by the intermediate inside guide member 204) can be made smaller than in the conventional examples, so that the play allowance Dβ of the ball can be made smaller than the play allowance Dα of the ball in its no-load condition within the circulation passage in the phase α in the curved track after the phase γ. And, due to this, similarly to the fourth embodiment, the play allowance Dβ of the ball in the curved track doorway is smaller than in the conventional examples, which can reduce the number of times of collisions of the balls 203 with the curved track outside guide member 201, curved track inside guide member 202 and linear track inside guide member 205, thereby being able to reduce the level of the noise involved with the collision of the ball. Also, since a method for working the components of the structure is neither so complicated nor so highly accurate, the noise level can be reduced easily while preventing an increase in the manufacturing cost of the apparatus. Further, especially, the intermediate inside guide member 204 has not only a function to adjust the play allowance of the ball but also a function to hold the ball to thereby prevent it from slipping out of position.

Figure 17:
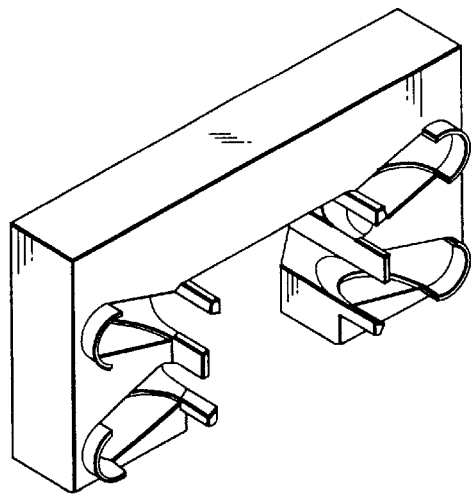
FIG. 17 is a perspective view of an end cap of a linear guide device according to another embodiment of the fourth to sixth embodiments of the invention.

In the fourth to sixth embodiments described heretofore, the tongue of the end cap for scooping up the ball is formed in a projecting type scoop-up shape in which the leading end of the tongue can be inserted into the ball rolling grooves of the guide rail. However, the invention is not limited to the above-mentioned scoop-up shape but, for example, the ball rolling grooves of the guide rail can be formed shallow and there can be employed such an end cap as shown in FIG. 17 which is formed in a recessed type scoop-up shape (a so called ship bottom type scoop-up end cap).

Figure 14:
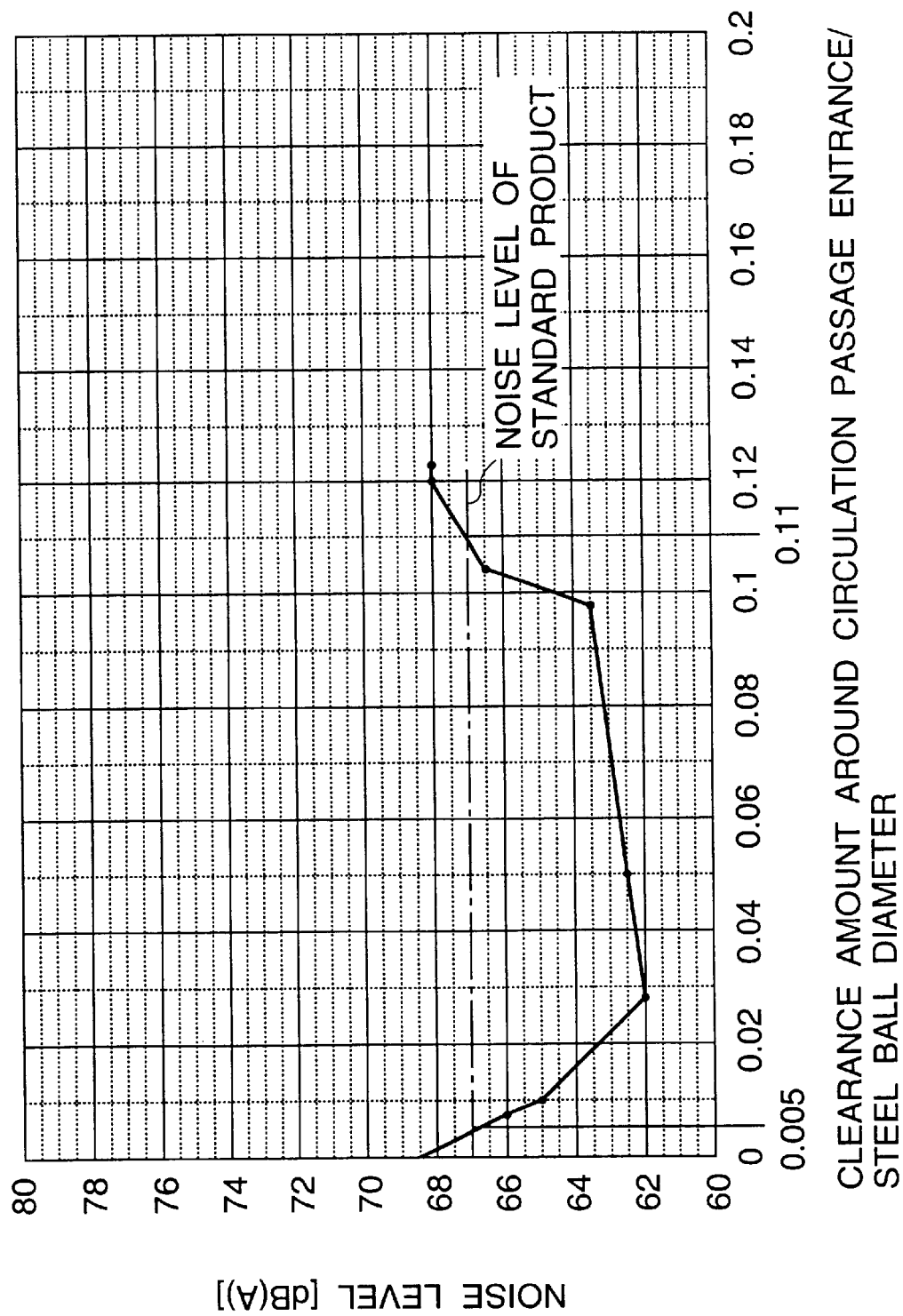
FIG. 14 is an explanatory view of noise levels used to evaluate the play allowances with respect to the diameters of the ball (the diameters of the steel ball) in the curved track doorway portion.

Next, a description will be given below of differences between the levels of noises obtained when, in the above-mentioned fourth to sixth embodiments, the play allowances of the ball in the curved track doorway, that is, in the circulation passage doorway are changed variously. FIG. 4 shows noise levels obtained when the greatest value (maximum value) of the play allowance (in FIG. 14, clearance amount) in the vicinity of the circulation passage doorway is expressed by a ratio with respect to the ball diameter (in FIG. 14, steel ball diameter), and the ratio is changed variously. On the other hand, in view of the fact that the noise level of a standard product is about 67 dB, the play allowance in the vicinity of the circulation passage doorway provides a noise level reducing effect in the range of about 0.5% to about 11% of the ball diameter and, especially, in the range of about 1.5% to 10%, the noise level reducing effect is large. Also, in case where the play allowance becomes extremely small, the noise level is great. This is because the extreme small play allowance induces a so called ball jam and the efficiency of the operation of the ball is thereby lowered. This coincides with an idiomatically used evaluation "that a ball needs a certain degree of play within a circulation passage".

As can be obviously understood from the foregoing description, according to the linear guide device of the invention, since the play allowance of the ball in at least one of the entrance of the ball into the curved track and the exit of the ball from the curved track is set smaller than the play allowance of the ball within the circulation passage where the ball is free from a load, the play allowance of the ball in the curved track doorway becomes small, which allows the ball to be guided into the circulation passage along a smooth and stable track, thereby being able to reduce the number of times of collisions of the ball with its peripheral members such as the guide members and guide rail, with the result that the level of the noise involved with the collision of the ball can be reduced as well as the operation performance of the ball can be enhanced. Also, because the play allowance of the ball in the curved track can be made small without requiring new members as well as without requiring complicated working or high-accuracy working, the invention can be enforced easily while preventing an increase in the manufacturing cost thereof.

While only certain embodiments of the invention have been specifically described herein, it will apparent that numerous modification may be made thereto without departing from the spirit and scope of the invention.

What is claimed is:

1. A linear guide device comprising:

a plurality of rolling elements;

a guide rail extending in an axial direction thereof and including a plurality of rolling element rolling grooves in two side portions thereof, said rolling groove extending in an axial direction of the guide rail;

a slider including a plurality of rolling element rolling grooves respectively opposed to said rolling element rolling grooves of said guide rail, said slider being supported on said guide rail in such a manner as to be movable along the axial direction of said guide rail through the rolling movements of said rolling elements respectively inserted between said rolling element rolling grooves of said guide rail and said rolling element rolling grooves of said slider, said slider defining a rolling element endless circulation track along which said rolling elements are allowed to circulate endlessly; and a plurality of separators, each interposed between said adjoining rolling elements in the circulation direction of said rolling elements, wherein a clearance is formed between one of said plurality of separators and one of said adjoining rolling elements in the rolling element endless circulation track.

2. A linear guide device according to claim 1, wherein said rolling elements are balls, and the total dimension of said clearances formed between said balls and said separators is set in a range of 2% to 63% of the diameter of said ball at a position of the phase of said balls in which the total dimension of said clearances in said rolling element endless circulation track is minimum.

* * * * *